United States Patent [19]
Toyota

[11] Patent Number: 5,862,050
[45] Date of Patent: Jan. 19, 1999

[54] SYSTEM FOR PREPARING PRODUCTION PROCESS FLOW

[75] Inventor: Hideo Toyota, Tokyo, Japan

[73] Assignee: NEC Corporation, Tokyo, Japan

[21] Appl. No.: 871,101

[22] Filed: Jun. 9, 1997

[30] Foreign Application Priority Data

Jun. 7, 1996 [JP] Japan .................................. 8-168390

[51] Int. Cl.⁶ .............................. G06F 19/00; G06G 7/64; G06G 7/66
[52] U.S. Cl. ............................ 364/468.03; 364/468.05; 364/468.06; 364/468.1; 364/578
[58] Field of Search .................................. 364/422, 149, 364/578, 150, 151, 468.03, 468.05, 468.06, 468.09, 468.1, 468.15, 468.16; 395/600, 650

[56] References Cited

U.S. PATENT DOCUMENTS

| | | | |
|---|---|---|---|
| 4,958,292 | 9/1990 | Kaneko et al. | 364/468 |
| 5,231,585 | 7/1993 | Kobayashi et al. | 364/468 |
| 5,414,843 | 5/1995 | Nakamura et al. | 395/600 |
| 5,442,561 | 8/1995 | Yoshizawa et al. | 364/468 |
| 5,452,453 | 9/1995 | Ando et al. | 395/650 |
| 5,495,417 | 2/1996 | Fuduka et al. | 364/468 |

FOREIGN PATENT DOCUMENTS 63-280411  11/1988  Japan .
5-266029   10/1993  Japan .
5-307555   11/1993  Japan .
6-176994   6/1994   Japan .

*Primary Examiner*—Reba I. Elmore
*Assistant Examiner*—Ramesh Patel
*Attorney, Agent, or Firm*—Foley & Lardner

[57] ABSTRACT

In a system for preparing a process flow in a many-kind variable-amount production line including a plurality of production processes, a target process flow block code is retrieved from a process flow block code name storage knowledge unit storing a plurality of process flow block names each composed of a combination of large processes and small processes, so that the target process flow block code is selected by use of a first selector. Similarly, a process flow block code next to the target process flow block code is selected, to prepare a process flow while discriminating an arrangement sequence of thus selected process flow block code in the process flow, with reference to a process flow arrangement sequence knowledge. A small process code is retrieved with reference to a condition key knowledge unit storing at least one item of condition key knowledge for each of the small processes, so as to select a condition key by use of a second selector. The process flow thus prepared is displayed by use of a process flow display, and a completed process flow is stored in units of product kind.

9 Claims, 23 Drawing Sheets

*FIG. 3B*
*PRIOR ART*

| PROCESS (A) | PROCESS (B) | INDISPENSABLE BETWEEN A AND B | NEVER REQUIRED BETWEEN A AND B | SPECIAL PROCESS | ERROR CODE |
|---|---|---|---|---|---|
| LITHOGRAPHY | RESIST REMOVAL | — | THERMAL OXIDATION | — | 005 |
| LITHOGRAPHY | LITHOGRAPHY | RESIST REMOVAL | — | — | 006 |

FIG. 7A

| PROCESS FLOW BLOCK NAME | LARGE PROCESS CODE | LARGE PROCESS NAME | SMALL PROCESS CODE | SMALL PROCESS NAME |
|---|---|---|---|---|
| GATE PHOTORESIST | A12 | GATE PHOTORESIST | F00 | DEPOSITION |
| | A12 | GATE PHOTORESIST | H02 | EXPOSURE |
| | A12 | GATE PHOTORESIST | F11 | DEVELOPMENT |
| | A12 | GATE PHOTORESIST | B44 | CHECK |
| | A12 | GATE PHOTORESIST | C00 | GATE ETCHING |
| POLYSILICON GROWTH | Z10 | POLYSILICON GROWTH | S00 | WASHING |
| | Z10 | POLYSILICON GROWTH | Z10 | POLYSILICON GROWTH |
| | Z10 | POLYSILICON GROWTH | M00 | FILM THICKNESS MEASUREMENT |

FIG. 7B

| PROCESS FLOW BLOCK NAME | PROCESS FLOW BLOCK CODE |
|---|---|
| GATE PHOTORESIST | W00 |
| POLYSILICON GROWTH | Q00 |

FIG. 8

| CURRENT PROCESS FLOW BLOCK CODE → <br> NEXT PROCESS FLOW BLOCK CODE ↓ | A01 | A02 | A03 | A04 | A05 | A06 |
|---|---|---|---|---|---|---|
| A01 | X | X | X | X | O | X |
| A02 | X | X | X | X | O | O |
| A03 | X | X | O | O | X | X |
| A04 | X | X | X | O | X | X |
| A05 | O | O | X | X | X | X |
| A06 | X | O | X | X | X | O |

FIG. 9

| PROCESS FLOW BLOCK NAME | INHIBIT PROCESS FLAG | LARGE PROCESS CODE | LARGE PROCESS NAME | SMALL PROCESS CODE | SMALL PROCESS NAME | INTERMEDIATE PROCESS FLAG |
|---|---|---|---|---|---|---|
| GATE PHOTORESIST | | A12 | GATE PHOTORESIST | F00 | DEPOSITION | |
| | | A12 | GATE PHOTORESIST | H02 | EXPOSURE | |
| | | A12 | GATE PHOTORESIST | F11 | DEVELOPMENT | |
| | | A12 | GATE PHOTORESIST | B44 | CHECK | |
| | | A12 | GATE PHOTORESIST | C00 | GATE ETCHING | |
| POLYSILICON GROWTH | | Z10 | POLYSILICON GROWTH | S00 | WASHING | 1 |
| | | Z10 | POLYSILICON GROWTH | Z10 | POLYSILICON GROWTH | 1 |
| | | Z10 | POLYSILICON GROWTH | M00 | FILM THICKNESS MEASUREMENT | 1 |

FIG. 10

| SMALL PROCESS CODE | SMALL PROCESS NAME | CONDITION KEY | CONDITION DETAILS |
|---|---|---|---|
| T00 | As IMPLANTATION | ITE0000 | ION IMPLANTATION TARGET As 150keV 3.0E12 |
| | | ITE0001 | ION IMPLANTATION TARGET As 150keV 4.0E13 |
| T01 | P IMPLANTATION | ITC0000 | ION IMPLANTATION TARGET P 150keV 3.0E12 |
| | | ITC0001 | ION IMPLANTATION TARGET P 150keV 4.0E13 |
| | | | |

*FIG. 15*

| OBJECT PRODUCT | PROCESS FLOW BLOCK CODE | ERROR CONTENT |
|---|---|---|
| G / A | A01 | SEQUENCE ERROR |

FIG. 19A

| NEXT BLOCK NAME \ BLOCK NAME | A | B | C | • • • • • • • • • • • • | Z |
|---|---|---|---|---|---|
| A | △ | X | O | • • • • • • • • • • • • | O |
| B | △ | | | | |
| C | O | | | | |
| • | • | | | | |
| • | • | | | | |
| • | • | | | | |
| • | • | | | | |
| • | • | | | | |
| • | • | | | | |
| Z | X | | | | |

FIG. 19B

| BLOCK NAME | A | A | B | • • • • • • • | Z |
|---|---|---|---|---|---|
| SMALL PROCESS NAME SEQUENCE | a b c d • • • • | a b e f • • • • | • • • • • • • • | • • • • • • • • | • • • • • • • • |

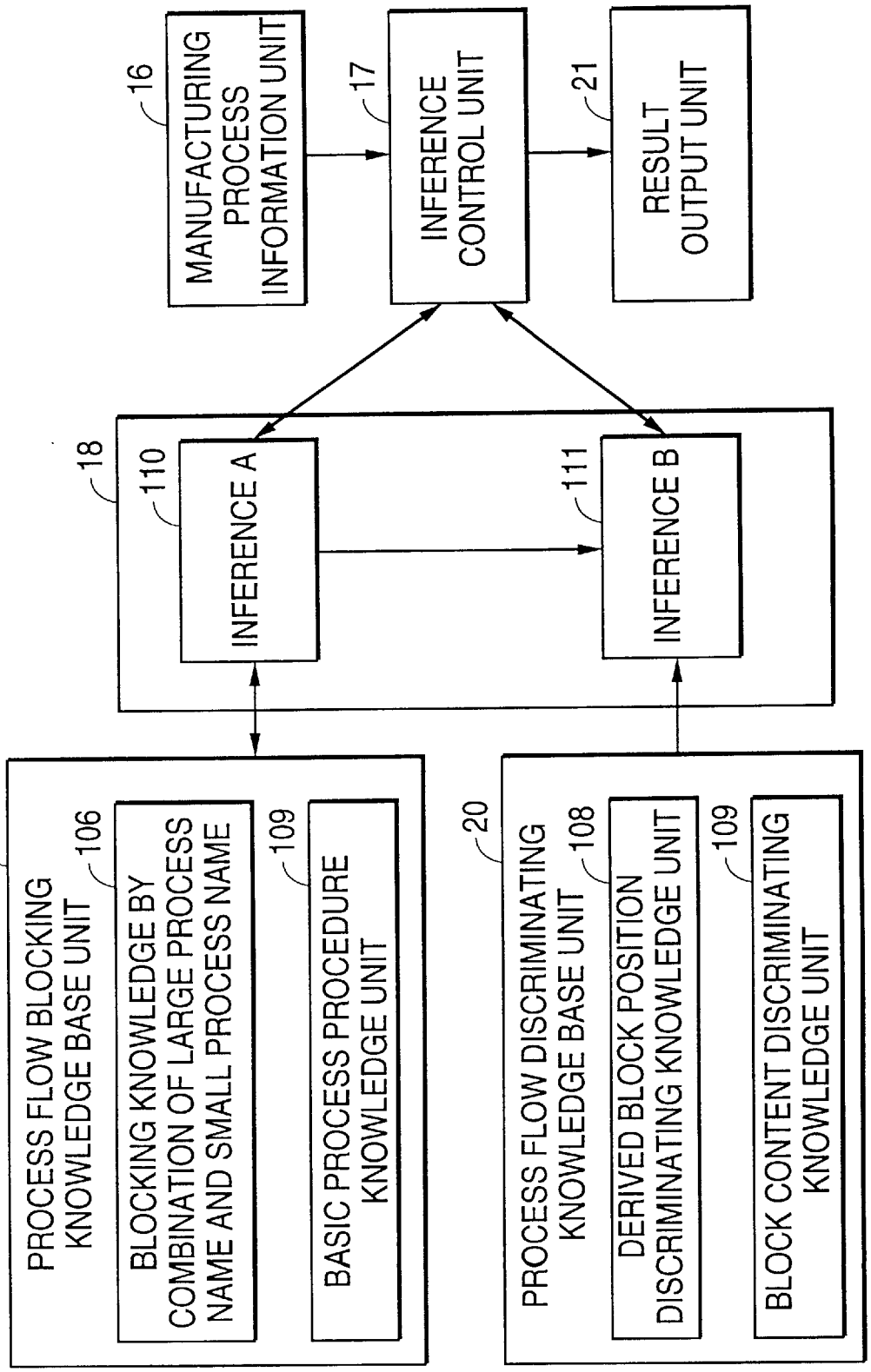

FIG. 22

| BLOCK INSERTION POSITION \ DERIVED BLOCK NAME | A' B' C' • • • • • • • • • • • • • Z' |
|---|---|
| ① | O  X  X |
| ② | X  X  O |
| ⋮ | |

5,862,050

SYSTEM FOR PREPARING PRODUCTION PROCESS FLOW

BACKGROUND OF THE INVENTION

1. Field of the invention

The present invention relates to a system for checking a production process procedure in a many-kind variable-amount production line including a plurality of production processes, and more specifically to a production process procedure checking system for discriminating an inconvenient sequence in the production process procedures on the basis of a previously prepared knowledge base, and a system for making or preparing a production process flow in a many-kind variable-amount production line.

2. Description of related art

In the many-kind variable-amount production line including a plurality of production processes, the production process procedure for each product kind have become long and complicated, and therefore, a support system for precisely and quickly making or preparing a complicated production process procedure in the production line, is demanded. In addition, if the production process procedure prepared for each individual product kind is checked by a human operator, a long time is required, and a checking error is inevitable. Because of this, a system for automatically checking the production process procedure prepared for each individual product kind, is also demanded.

Now, an example of a prior art process flow preparing system will be described with reference to the accompanying drawings.

FIG. 1 illustrates the example of the prior art process flow preparing system. The shown prior art process flow preparing system includes a code management table 20-5 including process codes each indicating an individual unitary process by a plurality of digits of alphanumeric characters, an attribute management table 20-6 including process conditions each indicating a condition of each individual unitary process, a variable manager 20-4 coupled to these tables, a data selector 20-1 coupled to a variable manager 20-4 for selecting necessary information or data from the tables through the variable manager 20-4, a data display 20-2 coupled to the data selector 20-1 for displaying the data selected by the data selector 20-1, and a data storage unit 20-3 coupled to the data display 20-2 for storing the data.

In preparing or creating the process flow, the process codes and the process conditions are selected in accordance with the production procedure to be made, so as to prepare a flow of the selected processes, and a finally completed process flow is stored in the data storage unit.

When the process flow completed once is modified, and when a new process flow is created, as shown In FIG. 2, the completed process flow is copied, and the process code and the process condition to be added are selected, and then, added to the copied process flow. When a process is removed, similarly, the completed process flow is copied, and the process code and the process condition to be removed are selected, and then, removed from the copied process flow.

Japanese Patent Application Pre-examination Publication No. JP-A-5-266029 (an English abstract of which Is available from the Japanese Patent Office, and the content of its English abstract is incorporated by reference in its entirety into this application) discloses one example of the process flow preparing system for preparing the process flow as mentioned above. In addition, Japanese Patent Application Pre-examination Publication No. JP-A-6-176994 (an English abstract of which is available from the Japanese Patent Office, and the content of its English abstract is incorporated by reference in its entirety into this application) discloses a production process procedure checking system for discriminating whether or not the prepared process flow is suitable. For reference, the contents of JP-A-5-266029 and JP-A-6-176994 are substantially included in U.S. Pat. No. 5,495,417 (the content of which is incorporated by reference in its entirety into this application), since U.S. Pat. No. 5,495,417 claims the Convention Priorities based on applications of JP-A-5-266029 and JP-A-6-176994.

The production process procedure checking system as disclosed by JP-A-6-176994 has an object of quickly checking a long and complicated process flow. For this purpose, the production process procedure checking system has a function of grouping one process to another process as one package, and then checking whether or not there exists a process which is indispensable in the package, whether or not there exists a process which never exists in the package, whether or not there exists a process which is indispensable when a certain process exists.

FIG. 3A illustrates the prior art production process procedure checking system disclosed by JP-A-6-176994 and therefore by U.S. Pat. No. 5,495,417. Here, only portions relating to the present invention will be described. This system includes a package checker 831, a package condition management table 833, a check decision unit 857 and a check management table 859. Under the instructions from the check decision unit 857, while referring to the package condition management table 833, the package checker 831 checks whether or not processes included in each package is normal.

FIG. 3B illustrates the content of the package condition management table 833 included in the prior art production process procedure checking system shown in FIG. 3A. The package condition management table 833 includes, for each one package, the name of the process constituting the package concerned (PROCESS (A), PROCESS (B)), the name of the process indispensable in the package concerned, the name of the package that never exists in the package concerned, the name of the process which is indispensable when a certain process exists (SPECIAL PROCESS), and an error code. In the example shown in FIG. 3B, a thermal oxidation process is never allowed to exist between a lithography (PROCESS (A)) and a resist removal (PROCESS (B)). Therefore, if the thermal oxidation process exists, it is notified that the package is not normal (the error code "005)).

However, the following problems have been encountered in the above mentioned prior art technology.

A first problem is that when the process flow is copied and the process codes and conditions for a plurality of processes are added to or removed from the copied process flow, it is not possible to completely avoid the possibility of an input error. The reason for this is that, for example, when a plurality of processes are added to or removed from the process flow composed of several hundred processes, a correlation with a succeeding process cannot be immediately checked.

In this connection, it may be considered that after the process flow is prepared in accordance with the method disclosed by JP-A-5-266029, the process flow thus prepared is checked in accordance with the method disclosed by JP-A-6-116994. In this case, however, if a portion to be modified is found out after the checking is finished, it is necessary to repeat the checking after making the modification. As a result, a large processing time becomes necessary.

A second problem is that, since a new process flow is prepared by utilizing a copy of the process already prepared, respective process flows for a plurality of different kinds become different in fine process flows, with the result that there occurs the possibility that a suitable process flow cannot be developed for all kinds of products by modifying the equipments in the production line. The reason for this is that, when a plurality of process flows are copied and when the original process flows include a process flow which does not match with an actual situation of the production line, a necessary modification may be omitted unless the process flow designer is aware of the situation forgotten.

A third problem is that, if the condition are selectively inputted for the selected process code as In the method disclosed by JP-A-5-266029, a code input often needs: a long time. The reason for this is considered that, since the process code indicating the process name and the condition code are inputted separately, when there is long process flow, a long time is required for inputting the condition codes, one by one.

In the prior art production process procedure checking system disclosed by JP-A-6-176994. the checking is conducted for each individual process, on the basis of the individual process name and a before-and-behind relation (context) of the individual process name concerned. Therefore, an inference time becomes extremely long when the production process procedure includes several hundred processes, and the knowledge base required for the checking correspondingly becomes voluminous, wit the result that maintenance becomes difficult.

Furthermore, in the prior art production process procedure checking system disclosed by JP-A-6-176994, since the checking is conducted on the basis of the before-and-behind relation (context) of the individual process name as mentioned above, when an attempt is made to insert an additional process into a portion where the arrangement sequence of processes are determined to some degree in the production process procedure, there is possibility that the insertion of the additional process is not inhibited. As a result, the arrangement sequence of processes and the name of processes cannot be made common in various production process procedures.

SUMMARY OF THE INVENTION

Accordingly, it is an object of the present invention to overcome the above mentioned various defects of the conventional one.

Another object of the present invention is to provide a system for making it possible for anyone to easily, precisely and quickly prepare a complicated and long production process flow in matching with a current situation of a production line.

Still another object of the present invention is to provide a production process procedure checking system for efficiently and quickly checking the arrangement sequence of processes in a complicated and long production process flow.

A further object of the present invention is to provide a production process procedure checking system capable of standardizing a process flow.

In the process flow preparing system in accordance with the first concept of the present invention, the process flow block code to be selected and the condition key for the the process flow block code to be selected are retrieved by a retrieval unit, and actually selected by a first selector and a second selector, respectively. The process flow block code and the condition key thus selected are displayed in the process flow display, and temporarily stored in the selector unit. Thus, the process flow is prepared while checking the arrangement sequence of the process flow block codes in the process flow at each time one process flow block is selected. The process flow finally completed is stored in the process flow storage, regardless of whether It is a final process or an intermediate process.

Accordingly, the overall process flow is constituted of a combination of process flow blocks while selecting one condition key corresponding to a previously registered process code. Therefore, it is no longer necessary to select processes and conditions, one after one.

In the process flow preparing system in accordance with the second concept of the present invention, on the basis of the process flow knowledge and the condition key knowledge composed of a condition detailed knowledge indicating a correspondence between each small process and some number of condition details, a portion to be modified is retrieved by a first retrieval unit comprising a first retrieval part for retrieving a process flow block name to be modified, its corresponding process flow block code and its relating process flow arrangement sequence and second retrieval part for retrieving a condition key corresponding to a small process to be modified. The portion to be modified is actually selected by the selector unit including the first selector for selecting the process flow block code to be modified and its relating process flow arrangement sequence and the second selector for selecting the condition key corresponding to the small process to be modified. The thus selected process flow block code or the process flow arrangement sequence or the condition key is displayed in the process flow display, and the process flow information Is modified by the process flow information modification means, and the modified content is displayed in the process flow display for confirmation. The modified content is furthermore selectively supplied through the data transfer means to the process flow for each product kind, and the process flow modified by the transferred modified data is stored in the process flow storage, If inconvenience occurs in the process flow because of the modified content, the product kind in which the inconvenience occurred and a position where the inconvenience occurred are displayed in the process flow information display, and a necessary modification is made again.

In the second aspect of the present invention, the process flow block code and the condition key are modified to match with the actual situation of the production line, and the result of the modification is selectively transferred to the process flow for each product kind so as to modify the process flow for each product kind. Therefore, it is no longer necessary to individually modify the process flow, one product kind after another A modification missing does not occur.

In the production process flow checking system in accordance with the fourth aspect of the present invention, a large and complicated production process procedure is divided into a plurality of process flow blocks each composed of a combination of one large process and a plurality of small processes for the one large process. Whether or not an arrangement sequence of process flow blocks is proper is discriminated on the basis of the process flow block arrangement sequence previously prepared for each process flow block. After the object of the inference is restricted, the arrangement sequence of small processes In each process flow block is discriminated, so as to conduct a detailed inference. An effective discrimination result can be obtained within a short time.

In the production process flow checking system In accordance with the fourth aspect of the present invention, a large and complicated production process procedure is divided into the basic process procedure and the derived blocks. As a result, the scale of the knowledge base required for checking the production process procedure can be reduced, and a quick and precise checking becomes possible.

In a specific embodiment of the production process flow checking system in accordance with the third and fourth aspect of the present invention, for each process flow block name, the model pattern is previously prepared which is composed of small process names arranged in a predetermined standard sequence, and the arrangement sequence of small process names in each process flow block is compared to the corresponding model pattern, in order to discriminate whether or not the arrangement sequence of small process names is proper. Accordingly, the production process procedure can be standardized, and therefore, the checking error can be reduced.

The above and other objects, features and advantages of the present invention will be apparent from the following description of preferred embodiments of the invention with reference to the accompanying drawings.

BRIEF DESCRIPTION OF THE DRAWINGS

FIG. 3B illustrates the content of the package condition management table included in the prior art production process procedure checking system shown in FIG. 3A;

FIG. 7A illustrates an example of the process flow block-names which are stored in the process flow block name storing knowledge unit and each of which is composed of a combination of large process names and small process names;

FIG. 7B illustrates an example of the content stored in the process flow block code knowledge unit, giving correspondence between the process flow block name and the process flow block codes;

FIG. 8 illustrates an example of the content stored in the process flow block code sequence knowledge unit, giving information as to whether or not it is allowed to insert the selected process flow block code after the just previously selected process flow block code;

FIG. 9 illustrates an example of the inhibit indication in relation with the process flow block code name, the large process name and the small process name;

FIG. 10 illustrates an example of the content stored in the condition key knowledge unit, giving correspondence between various small process names and several condition details from which one is selected for each one small process name;

FIG. 15 illustrates an example of inconvenience in the process flow, found in the second embodiment, indicating an error content in relation to the product kind and the process flow block code;

FIG. 19A illustrates an example of the content of the block context discriminating knowledge in the production process procedure checking system shown in FIG. 16;

FIG. 19B illustrates an example of the content of the block content discriminating knowledge in the production process procedure checking system shown in FIG. 16;

FIG. 20 is a block diagram of another embodiment of the production process procedure checking system in accordance with the present invention;

FIG. 22 illustrates an example of the content of the derived block position discriminating knowledge in the production process procedure checking system shown in FIG. 20.

DESCRIPTION OF THE PREFERRED EMBODIMENTS

EMBODIMENT 1

Figure 1:
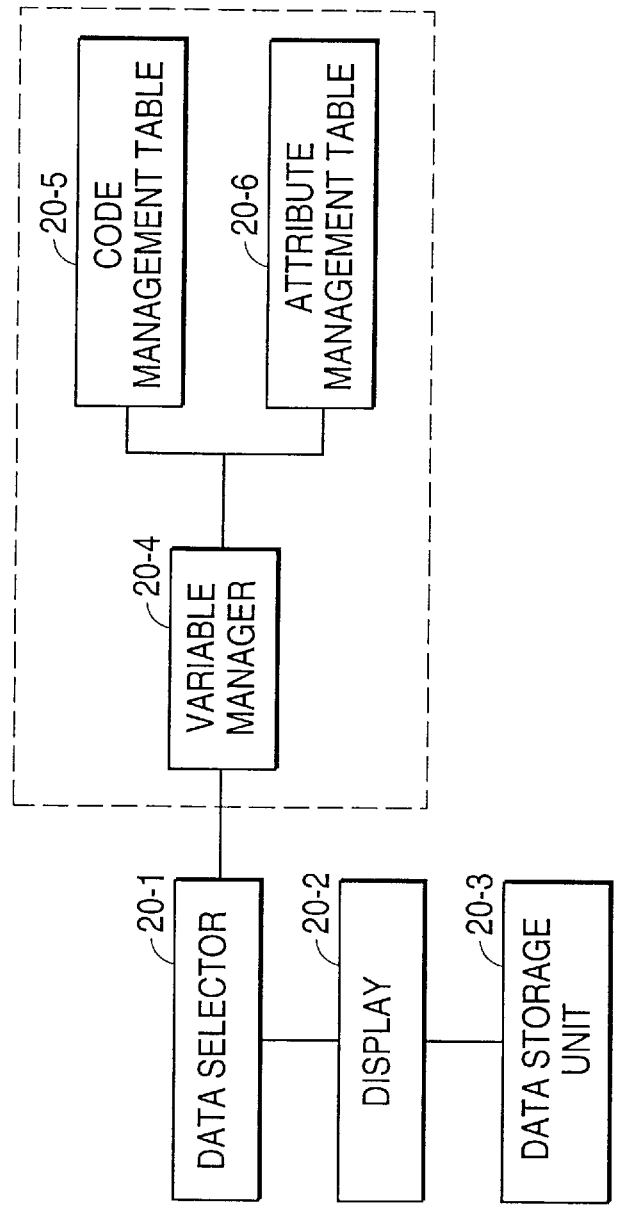
FIG. 1 illustrates the example of the prior art process flow preparing system.
Figure 2:
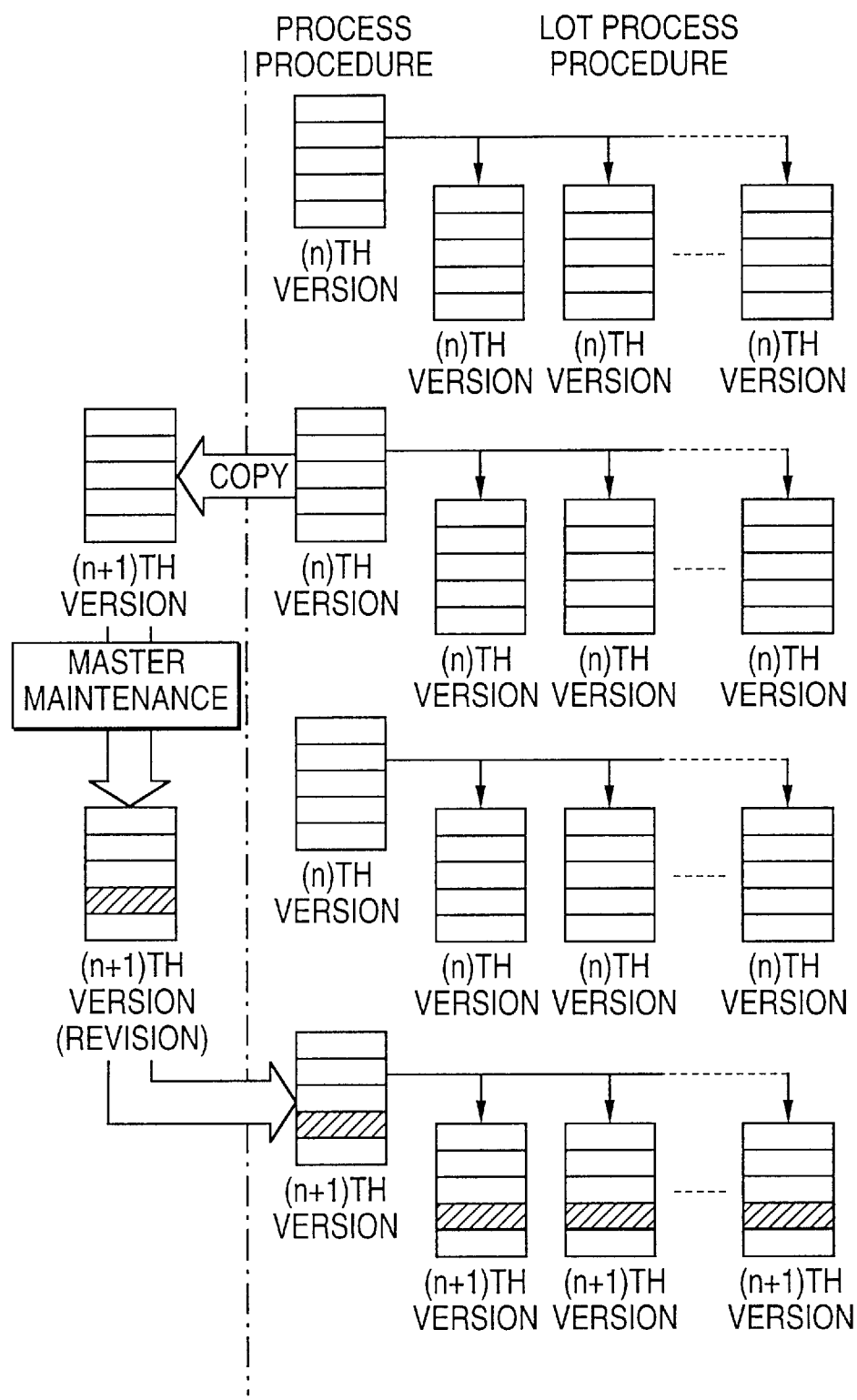
FIG. 2 illustrates a prior art method for creating a new process flow by copying and modifying the process flow already completed.
Figure 3A:
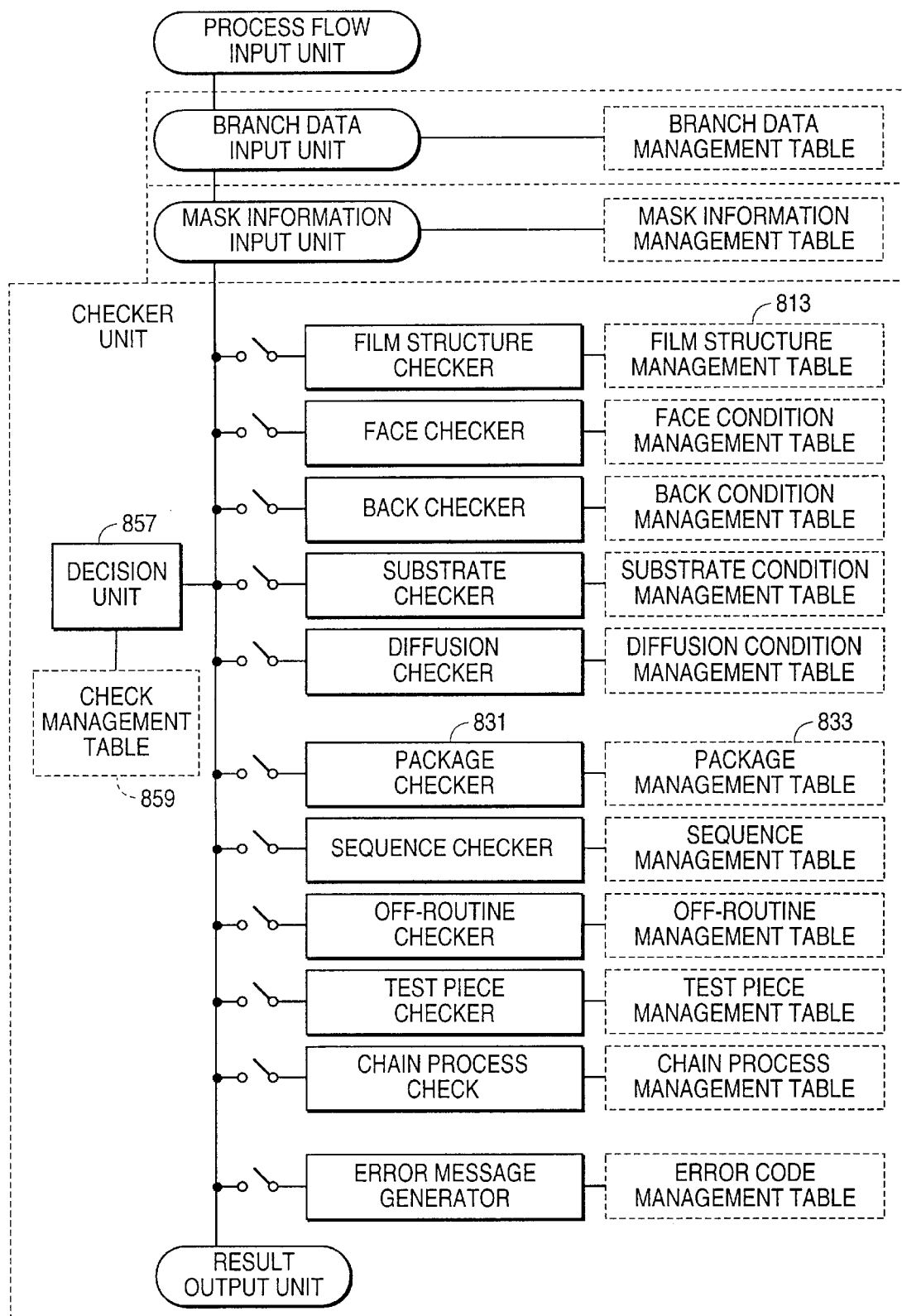
FIG. 3A illustrates an example of the prior art production process procedure checking system.
Figure 4:
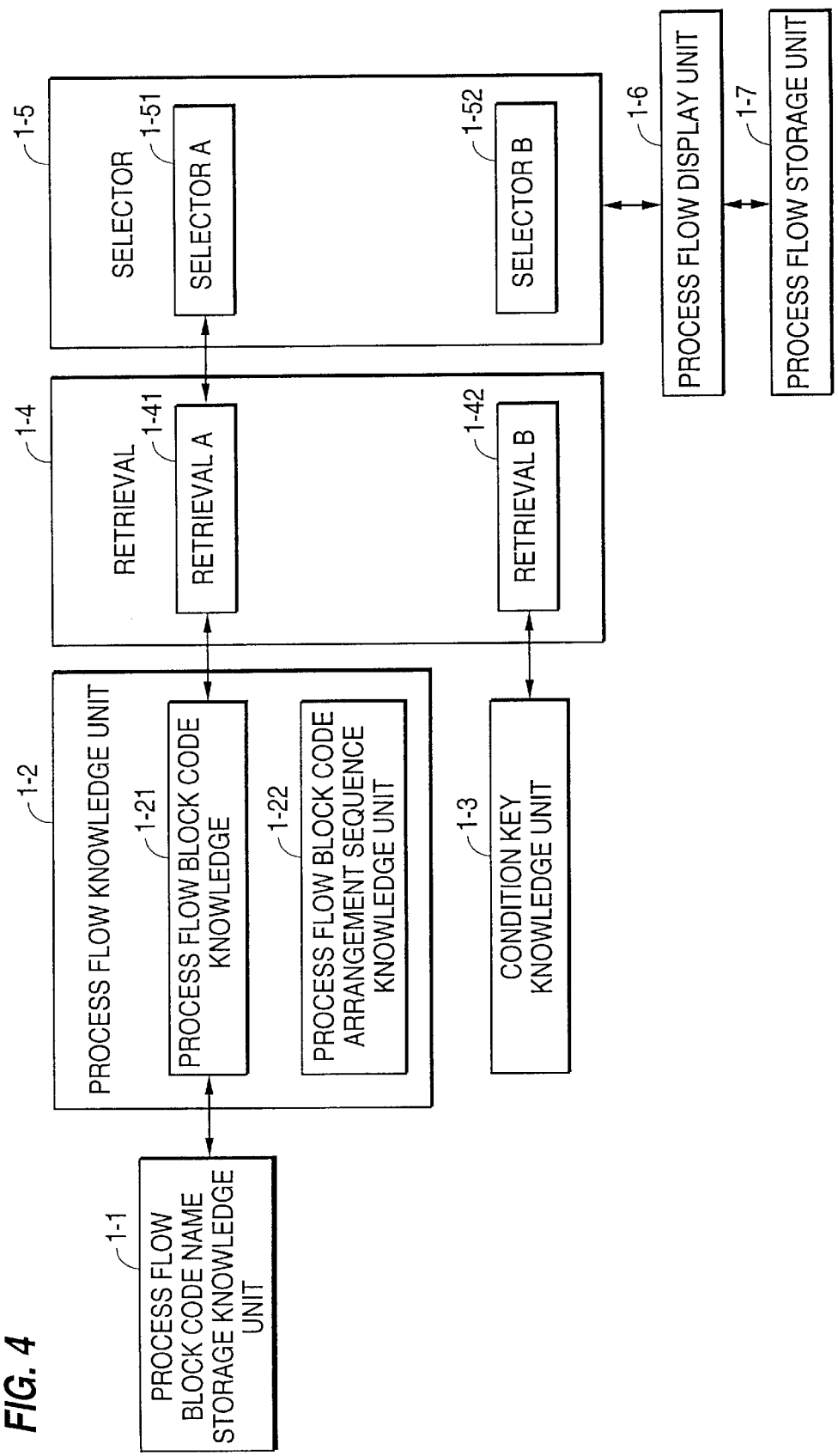
FIG. 4 is a block diagram of a first embodiment of the production process flow preparing system in accordance with the present invention.

Referring to FIG. 4, there is shown a block diagram of a first embodiment of the production process flow preparing system in accordance wit the present invention.

The shown first embodiment includes a process flow block code name storing knowledge unit 1-1 storing a plurality of process flow block names each composed of a combination of large processes and small processes. There is further shown a process flow knowledge unit 1-2 including a process flow block code knowledge unit 1-21 storing a plurality of process flow block codes each convened or translated from a corresponding process flow block name, and a process flow block code arrangement sequence knowledge unit 1-22 storing information which defines the arrangement sequence of a current process flow block and a next process flow block. The shown first embodiment also includes a condition key knowledge unit 1-3 storing several items of condition key knowledge for each small process code, a retrieval unit 1-4 including a retrieval part A, 1-41 for retrieving the process flow block name and the process flow block code and a retrieval part B, 1-42 for retrieving the condition key, and a selector unit 1-5 including a selector A, 1-51 for selecting and storing the process flow block code and a selector B, 1-52 for selecting and storing the condition key, a process flow display 1-6 for displaying the selected process flow, and a process flow storage 1-7 for storing the prepared process flow.

Figure 5:
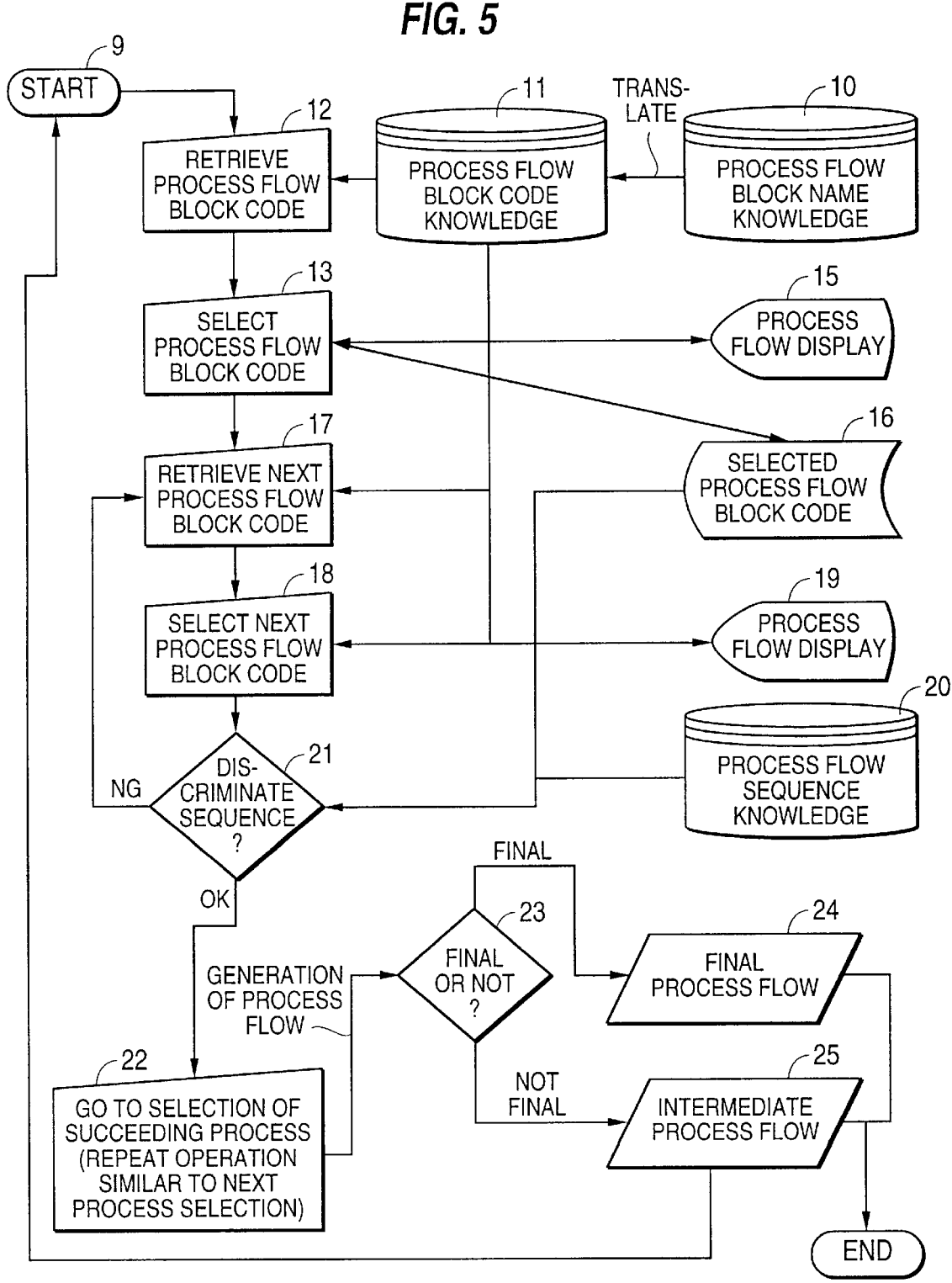
FIGS. 5 and 6 are flowcharts illustrating an operation of the first embodiment.
Figure 6:
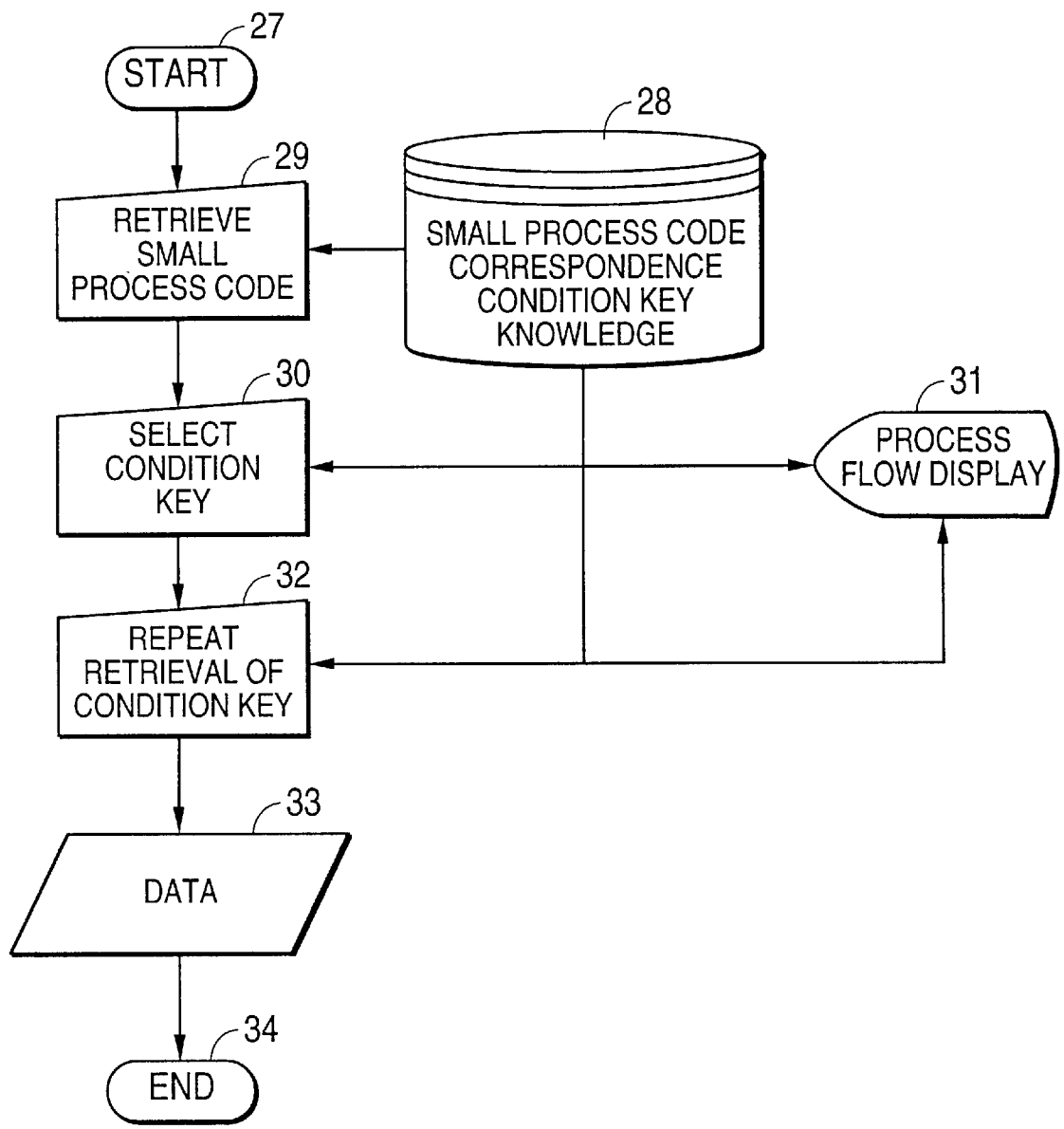

Now, an operation of the shown first embodiment will be described with reference to FIGS. 4, 5 and 6. FIGS. 5 and 6 are flowcharts illustrating an operation of the first embodiment.

First, the system is started up (step 9). In a step 12, the retrieval part A, 1-41 retrieves the process flow block code knowledge unit 1-21 which stores a plurality of process flow block codes as shown in FIG. 7B, each code being translated from the process flow block name storing knowledge unit 1-1 storing a plurality of process flow block names each composed of a combination of large process names and small process names as shown in FIG. 7A. The-eafter, a process flow block code to be selected, is manually inputted or selected by the selector A, 1-51 (step 13).

The selected process flow block code is temporarily stored in the selector A, 1-51 (step 16), and furthermore, the large process codes, the small process codes, the large process names corresponding to the large process codes, and the small process names corresponding to the small process codes, are displayed in the process flow display 1-6, as shown in FIG. 6 (step 15).

When a next process flow block is selected, the above mentioned operation is repeated (steps 17 and 18). Succeedingly, the selector A, 1-51 discriminates whether or not the arrangement sequence is proper, with reference to the information of the process flow block code sequence knowledge unit 1-22, which stores information as to whether or not it is allowed to insert the newly selected process flow block code after the just previously selected process flow block code, as shown in FIG. 8.

If it is allowed to be inserted the selected process flow block code is temporarily stored in the selector A, 1-51, On the other hand, the large process codes and the small process codes corresponding to the previously selected process flow block code and the newly selected process flow block code, respectively, and the large process names and the small process names corresponding to those large process codes and those small process codes, respectively, are displayed in the process flow displayed 1-6 (step 19).

On the other hand, if the newly selected process flow block code is not allowed to be inserted after the just previously selected process flow block code, the selector A, 1-51 supplies information indicative of an "inhibit process" to the process flow display 1-6, so that an inhibit indication (inhibit process flag) is displayed in the process flow display 1-6, as shown in FIG. 9. This inhibit indication remains until a next proper process flow block code is determined.

By repeating the above mention operation, succeeding process flow block codes are sequentially determined one by one, so that a sequential process flow portion is generated or prepared (step 22).

In a discriminating processing in a step 23, it is discriminated whether the process flow thus determined is a final process or an intermediate process. If the process flow thus determined is a final process, the process flow thus determined is finally stored, individually in units of process flow name, in the process flow storage 1-7 (step 24). However, if it is discriminated that the process flow thus determined is an intermediate process, a flag indicating that the process is an intermediate process ("intermediate process flag") is entered into the final process flow block code, as shown in FIG. 9.

Next, when the press flow having the intermediate process flag in an on condition, is read out from the process flow storage 1-7, the process flow is displayed in the process flow display 1-6, and also, the final process flow block code is supplied to the selector A, 1-51, so that the flow can be prepared while checking again (step 25).

Referring to FIG. 6, there is shown a flowchart illustrating a processing operation for inputting the condition.

First, the system is started up (step 27). The condition key knowledge unit 1-3 storing various small process names (such as As implantation) and several condition details from which one is selected for each small process name, as shown in FIG. 10, is retrieved by the retrieval part B, 1-42, and one small process code is selected by the selector B, 1-52 (steps 28 and 29) and then, a corresponding condition key is selected (step 30).

The selected condition key is temporarily stored in the selector B, 1-52. The selector B, 1-52 can unlimitedly store the selected condition keys (step 32). If the small process code included in the process flow can be made to correspond, in one-to-one relation, to one of several condition details in the condition key knowledge unit 1-3, the condition key and the condition detail corresponding to the small process code included in the process flow are displayed in the process flow display 1-6 (step 31).

The flow thus prepared is finally stored together with flow information of the process, individually in units of process flow name, in the process flow storage 1-7 (step 33).

The process flow can be prepared regardless of which of the process flow and the condition key is prepared in preference to the other.

EMBODIMENT 2

Now, a second embodiment of the production process flow preparing system in accordance with the present invention will be described.

Figure 11:
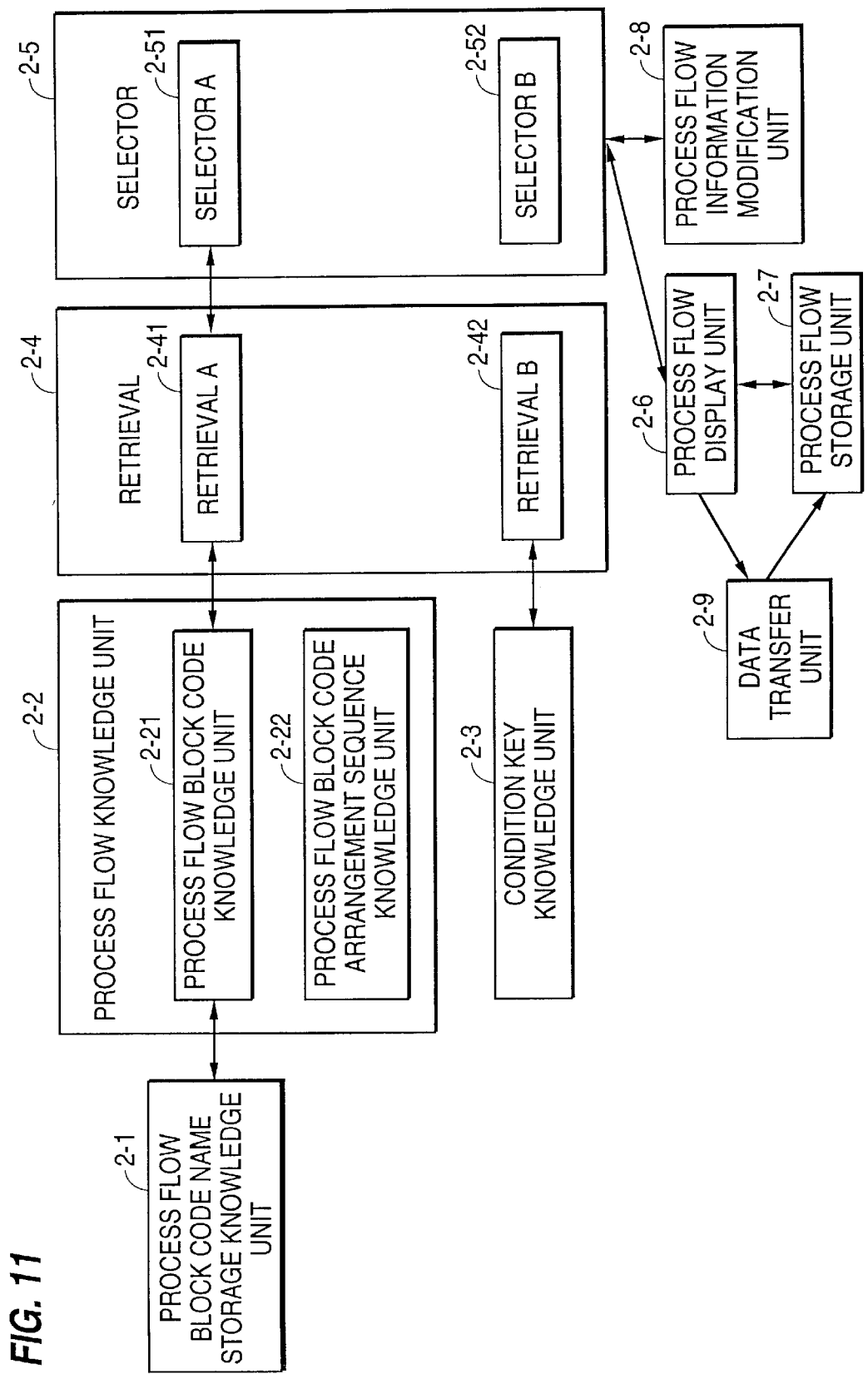
FIG. 11 Is a block diagram of a second embodiment of the production process flow preparing system in accordance with the present invention.

Referring to FIG. 11, there is shown a block diagram of the second embodiment of the production process flow preparing system in accordance with the present invention.

The shown second embodiment includes a process flow block name storing knowledge unit 2-1 storing a plurality of process flow block names each composed of a combination of large processes. There is further shown small processes, and a process flow knowledge unit 2-2 including a process flow block code knowledge unit 2-21 storing a plurality of process flow block codes each converted or translated from a corresponding process flow block name, and a process flow block code arrangement sequence knowledge unit 2-22 storing information which defines the arrangement sequence of a current process flow block and a next process flow block. The shown second embodiment also includes a condition key knowledge unit 2-3 storing several items of condition key knowledge composed of small process names and corresponding condition details from which one can be selected for each one small process name, a retrieval unit 2-4 including a retrieval part A, 2-41 for retrieving the process flow block name, the process flow block code and the process flow sequence knowledge, and a retrieval part B, 2-42 for retrieving the condition key corresponding to one small process code, and a selector unit 2-5 including a selector A, 2-51 for selecting and storing the process flow block code and the process flow sequence, and a selector B, 2-52 for selecting and storing the condition key corresponding to one small process code, a process flow display 2-6 for displaying the selected process flow block code or the process flow sequence knowledge or the condition key process flow information, a process flow information modification unit 2-8 for inputting information for modifying the process flow information, a data transfer unit 2-9 for selectively transferring the content of modification to the process flow for each of product kinds, and a process flow storage 2-7 for storing the process flow modified by the transferred data. The process flow display 2-6 also displays and confirms the modified content.

Figure 12:
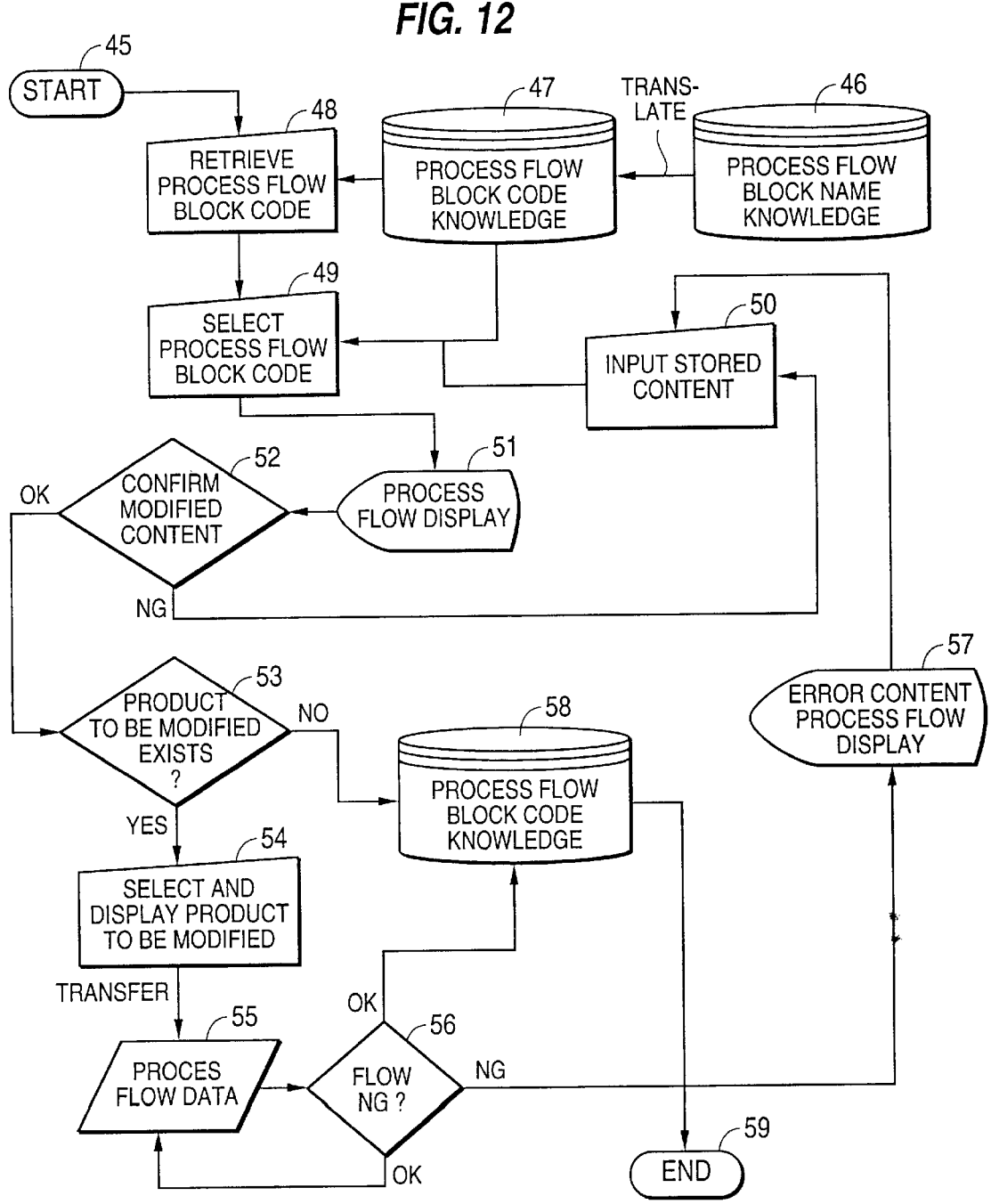
FIGS. 12, 13 and 14 are flowcharts illustrating an operation of the second embodiment.
Figure 13:
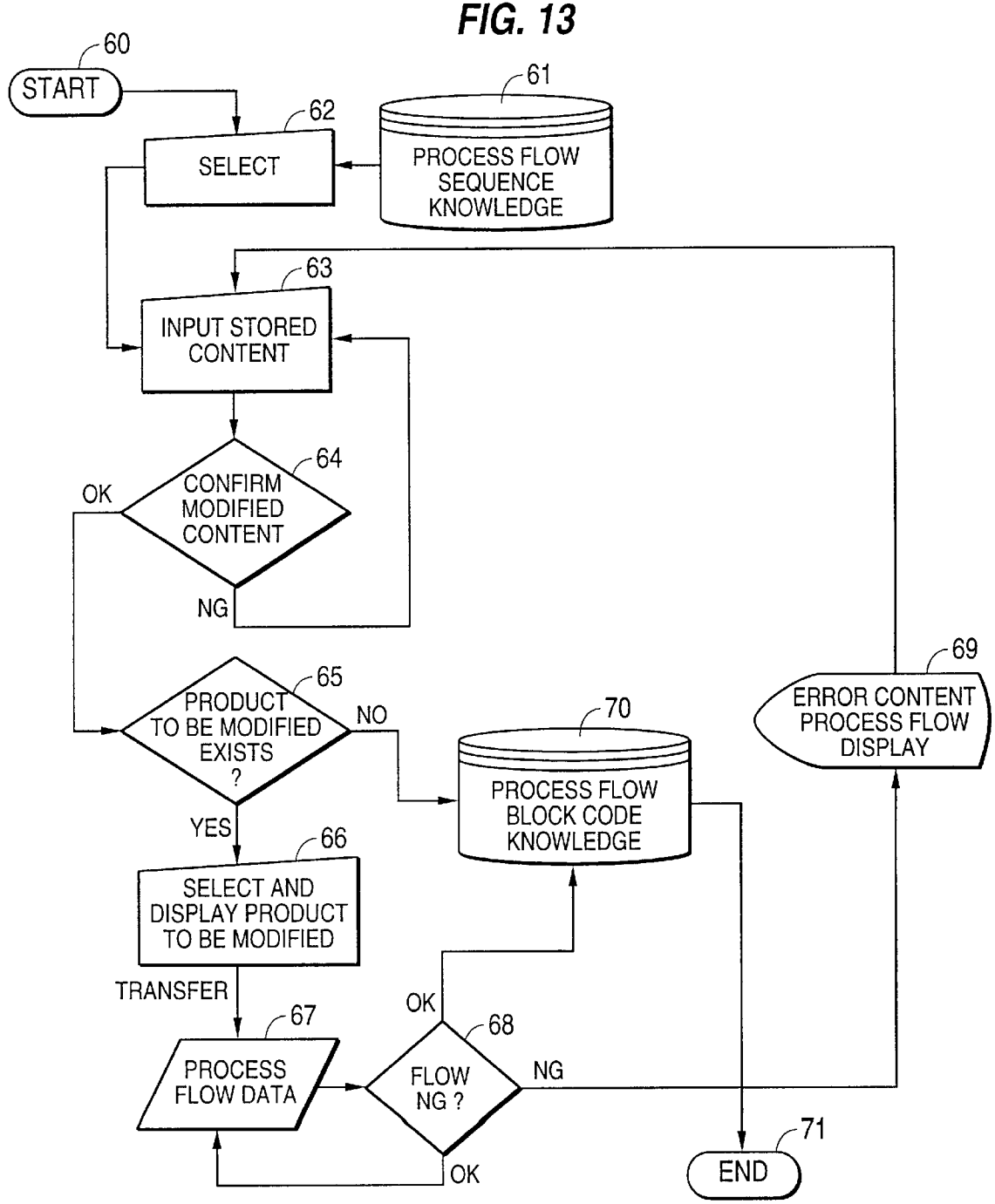
Figure 14:
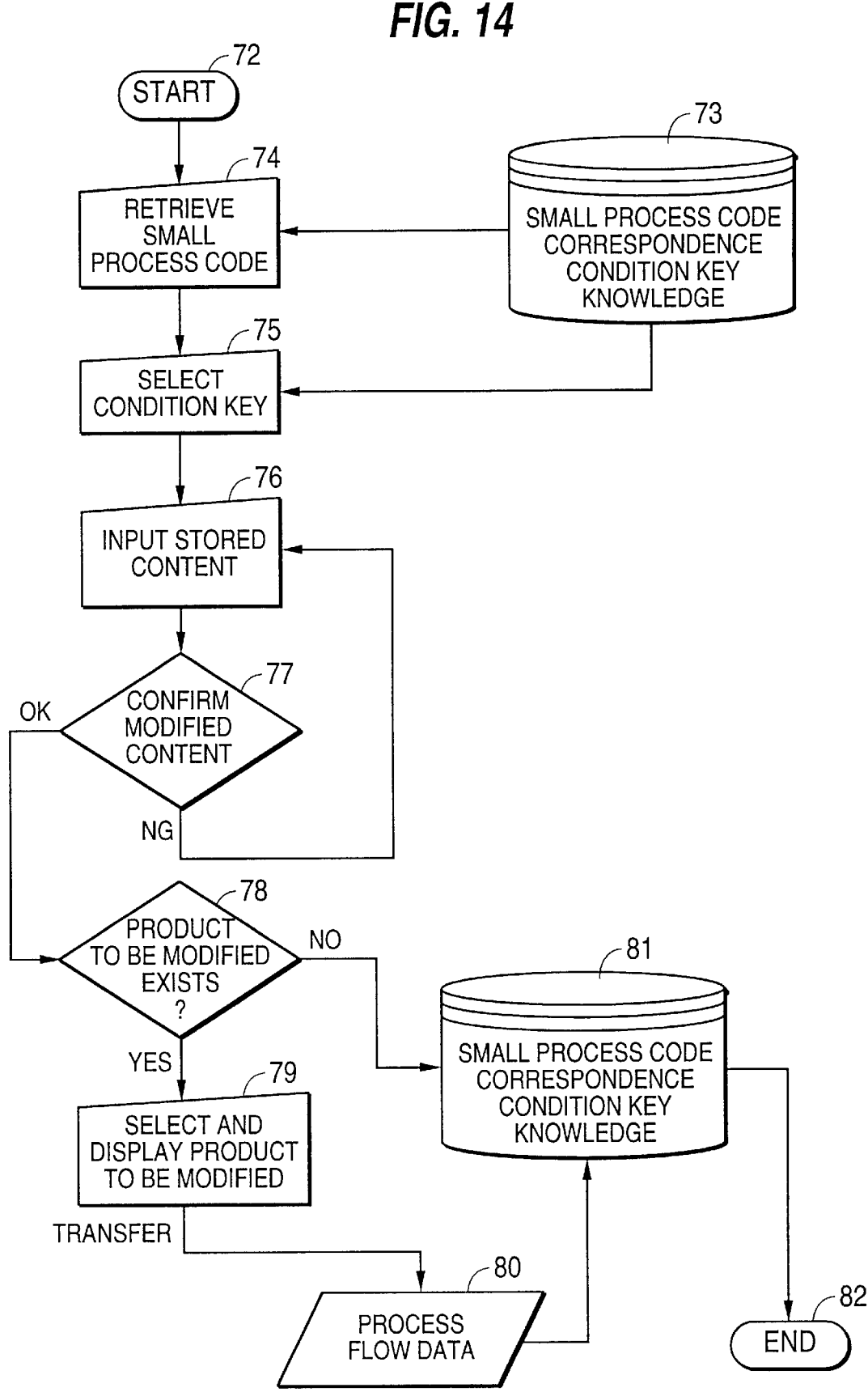

Now, an operation of the shown second embodiment will be described with reference to FIGS. 11, 12 13 and 14. FIGS. 12, 13 and 14 are flowchart illustrating an operation of the second embodiment.

Referring to FIG. 12, which a flowchart illustrating a process for modifying the process flow, first, the system is started up (step 45). In a step 48, for the purpose of finding out a process flow block code to be modified, the retrieval part A, 2-41 accesses the process flow block code knowledge unit 2-21 which stores a plurality of process flow block codes each code being translated from the process flow block name storing knowledge unit 2-1 storing a plurality of process flow block names each composed of a combination of large process names and small process names as shown. Thereafter, a process flow block code to be modified, is manually inputted or selected by the selector A, 2-51 (step 49).

The selected process flow block code is temporarily stored in the selector A, 2-51, and furthermore, the large process codes, the small process codes, the large process names corresponding to the large process codes, and the small process names corresponding to the small process codes, are displayed in the process flow display 2-6 (step 51).

On the other hand, a modification content of the process flow block code is inputted through the process flow information modification unit 2-8 (Step 50), so that the content of the process flow block code stored in the selector A, 2-51 is modified, and the modified content of the process flow block code is displayed in the process flow display 2-6, for confirmation (step 52).

If as the result of the confirmation processing in the step 52 it is found out that the modified content includes an error, the operation is repeated from the step 50 again where the modification content of the process flow block code is inputted trough the process flow information modification unit 2-8.

On the other hand, if the modified content is correct, it is discriminated whether or not there exists a product kind to be modified (step 53). If a product kind to be modified exists, the modified content is transferred to the process flow of the product kind to be modified or each of product kinds to be modified, which are stored in the process flow storage 2-7 and which are to be modified (steps 54 and 55). At this time, it is possible to modify all the product kinds stored in the data storage.

Thus, the information finally modified is stored in the process flow block code knowledge unit 2-21 (step 58).

After the data transfer, when an inconvenience occurs in the process flow because of the content modified, the product kind in question and the process flow block code in question are displayed in the process flow information display 26, as shown in FIG. 15 (steps 56 and 57).

In this case, the modification of the process flow block code and the modification of the arrangement sequence of the process flow block code are carried out in the process flow information modification unit 2-8 (step 50), and the modified information is transferred from the data transfer unit 2-9 to the process flow storage 2-7. Thus, the process flow is modified.

In the discrimination of step 53, if there is no product kind to be modified, the modified content may be not transferred to each of the product kinds (step 58).

Referring to FIG. 13, there is shown a flowchart illustrating a process for modifying the knowledge concerning the arrangement sequence of the process flow, in the second embodiment of the present invention. First, the system is started up (step 60).

The information of the process flow block code sequence knowledge unit 2-22, which defines the current process flow block code and the next process flow block code as shown in FIG. 8, is called to the selector A, 2-51, and also is displayed in the process flow information display 2-6 (step 62).

A modified content of the process flow block code arrangement sequence is inputted through the process flow information modification unit 2-8 (step 63), so that the content of the process flow block code arrangement sequence stored in the selector A, 2-51 is modified, and the modified content of the process flow block code arrangement sequence is displayed in the process flow display 2-6, for confirmation (step 64).

If as the result of the confirmation processing in the step 64 it is found out that the modified content includes an error, the operation is repeated from the step where the modified content of the process flow block code arrangement sequence is inputted through the process flow information modification unit 2-8.

On the other hand, if the result of the confirmation processing in the step 64 indicates the modified content is correct, it is discriminated whether or not there exists a product kind to be modified (step 65). If a product kind to be modified exists, the modified content is transferred from the data transfer unit 2-9 to the process flow of the product kind to be modified or each of product kinds to be modified, which are stored in the process flow storage 2-7 and which are to be modified (steps 66 and 67). At this time, it is possible to modify all the product kinds stored in the data storage. On the other hand, there may be a case that it is necessary to transfer the modified content to each of the product kinds.

After the data transfer, when an inconvenience occurs in the process flow because of the content modified, the product kind in question and the process flow block code in question are displayed in the process flow information display 2-6, as shown in FIG. 15 (step 69).

In this case, the modification of the process flow block code and the modification of the arrangement sequence of the process flow block code are carried out in the process flow information modification unit 2-8, and the modified information is transferred from the data transfer unit 2-9 to the process flow storage 2-7. Thus, the process flow is modified. The content finally modified Is stored in the process flow block code arrangement sequence knowledge unit 2-22 (step 70).

Referring to FIG. 14, which a flowchart illustrating a process for modifying the condition key in the second embodiment of the present invention. First, the system is started up (step 72). The condition key knowledge unit 2-3 storing various small process names (such as As implantation) and several condition details from which one is selected for each small process name, as shown in FIG. 10, is retrieved by the retrieval part B, 2-42 (step 74), and the condition key for one small process code to be modified is selected by the selector B, 2-52 (step 75) and displayed in the process flow information display 2-6.

A modified content of the condition key for the small process code is inputted through the process flow information modification unit 2-8 (step 76), so that the content of the condition key knowledge is modified, and the modified content of the condition key is displayed in the process flow display 2-6, for confirmation (step 77).

If as the result of the confirmation processing in the step 77 an error is found out in the modified content, the operation is repeated from the step where the modified content of the process flow block code arrangement sequence is inputted through the process flow information modification unit 2-8.

On the other hand, if the result of the confirmation processing indicates the modified content is correct it is discriminated whether or not there exists a product kind to be modified (step 78). If a product kind to be modified exists, the modified content is transferred from the data transfer unit 2-9 to the process flow of the product kind to be modified or each of product kinds to be modified, which are stored in the process flow storage 2-7 and which are to be modified (step 79). At this time, it is possible to modify all the product kinds stored in the data storage. On the other hand, if no product kind to be modified exists in the step 78, the modified content may not be transferred to each of the product kinds.

The content finally modified is stored in the condition key knowledge unit 2-3 (step 81).

In the above mentioned process flow modification can arbitrarily select for modification the process flow, the process arrangement sequence and the condition key.

EMBODIMENT 3

Now, an embodiment of the production process flow checking system in accordance with the present invention will be described with reference to FIG. 16, which is a block diagram of the embodiment of the production process procedure checking system in accordance with the present invention.

Figure 16:
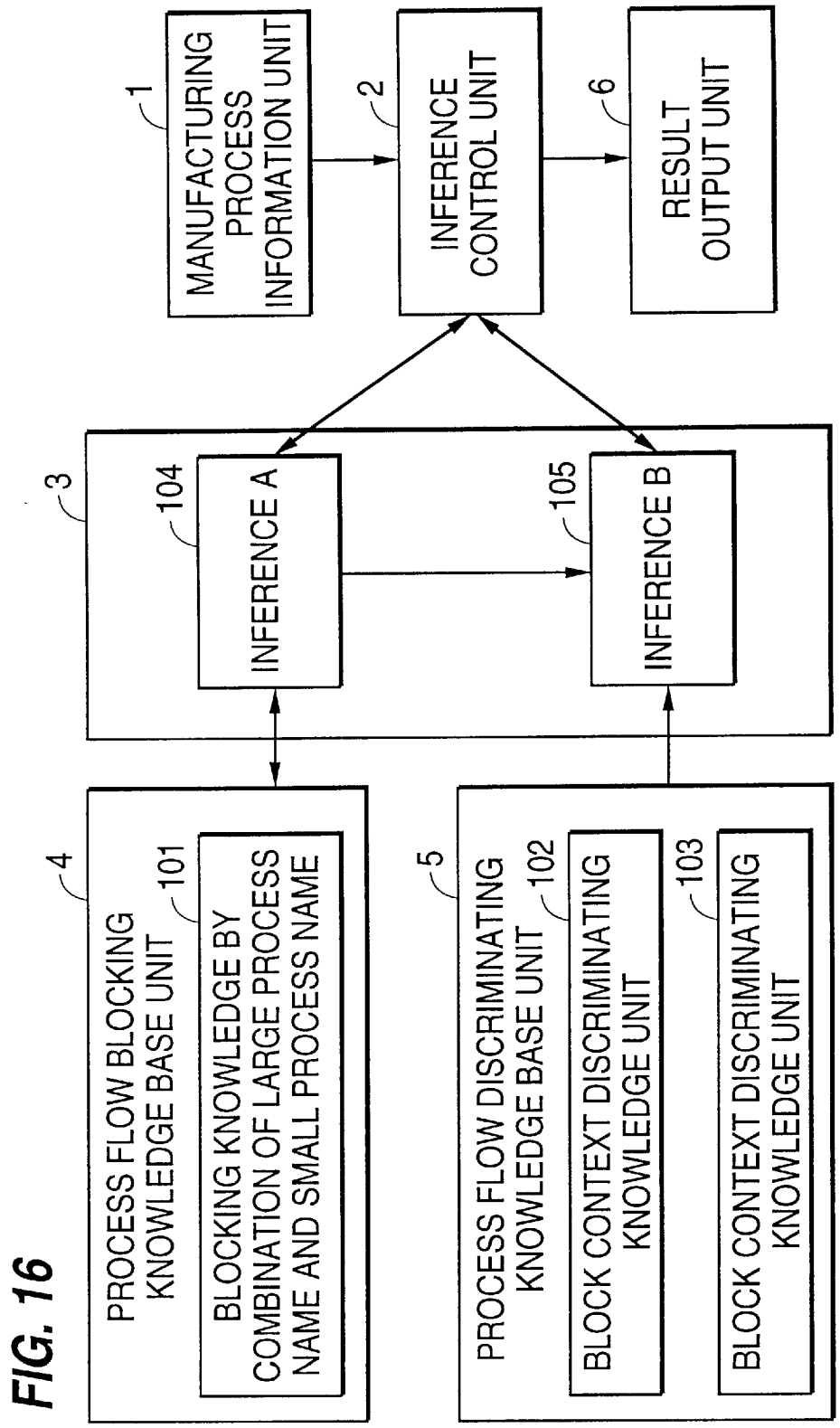
FIG. 16 is a block diagram of an embodiment of the production process procedure checking system in accordance with the present invention.

The production process procedure checking system includes a production process information unit 1, an inference control unit 2, an inference unit 3, a process flow blocking knowledge base unit 4, a process flow discriminating knowledge base unit 5 and a result output unit 6, which are coupled as s shown in FIG. 16. The inference unit 3 includes a first inference part A, 104 and a second inference part B, 105.

The production process information unit 1 contains information indicating the production process procedure of the multi-kind variable-amount production including a plurality of production processes. This information is constituted of various combinations of the small process name and the large process name including the small process name.

The inference control unit 2 receives information from the production process information unit 1, to supply the production process information to the first inference part A, 104, and controls a production process procedure discriminating of the first inference part A, 104 and the second inference part B, 105 of the inference unit 3, and supplies a result of the discrimination made in the inference unit 3 to the result output unit 6.

The first inference part A, 104 of the inference unit 3 receives the production process information from the inference control unit 2, and separates the production process procedure into units of large processes, namely into a plurality of blocks each consisting of only one large process, while referring to the process flow blocking knowledge base unit 4. The blocked production process procedure prepared by the first inference part A, 104 is transferred to the second inference part B, 105.

This second inference part B, 105 receives the information supplied from the first inference part A, 104, and discriminates, with reference to the process flow discriminating knowledge base unit 5, whether or not the arrangement sequence of the blocked large process names is proper, and whether or not the arrangement sequence of the small process names in each blocked large process is proper. The result of the discrimination is supplied to the inference control unit 2.

The process flow blocking knowledge base unit 4 includes a blocking knowledge unit 101 consisting of various combinations of large process names and small process names. Each combination is composed of one large process name and small process names included in that large process name. Incidentally, by referring to the process names and the small process names included in the blocking knowledge unit 101, it is possible to pick up a large process name and a small process name which are given a name that are not standard.

The process flow discriminating knowledge base unit 5 includes a block context discriminating knowledge unit 102 which contains knowledge used for discriminating a relation between a block name blocked in units of large process name and a just preceding or just succeeding block, and a block content discriminating knowledge unit 103 which contains knowledge used for discriminating an arrangement order of small process names included in each process flow block.

The result output unit 6 receives the result of discrimination from the inference control unit 2, and outputs the result of discrimination in a predetermined format.

Figure 17:
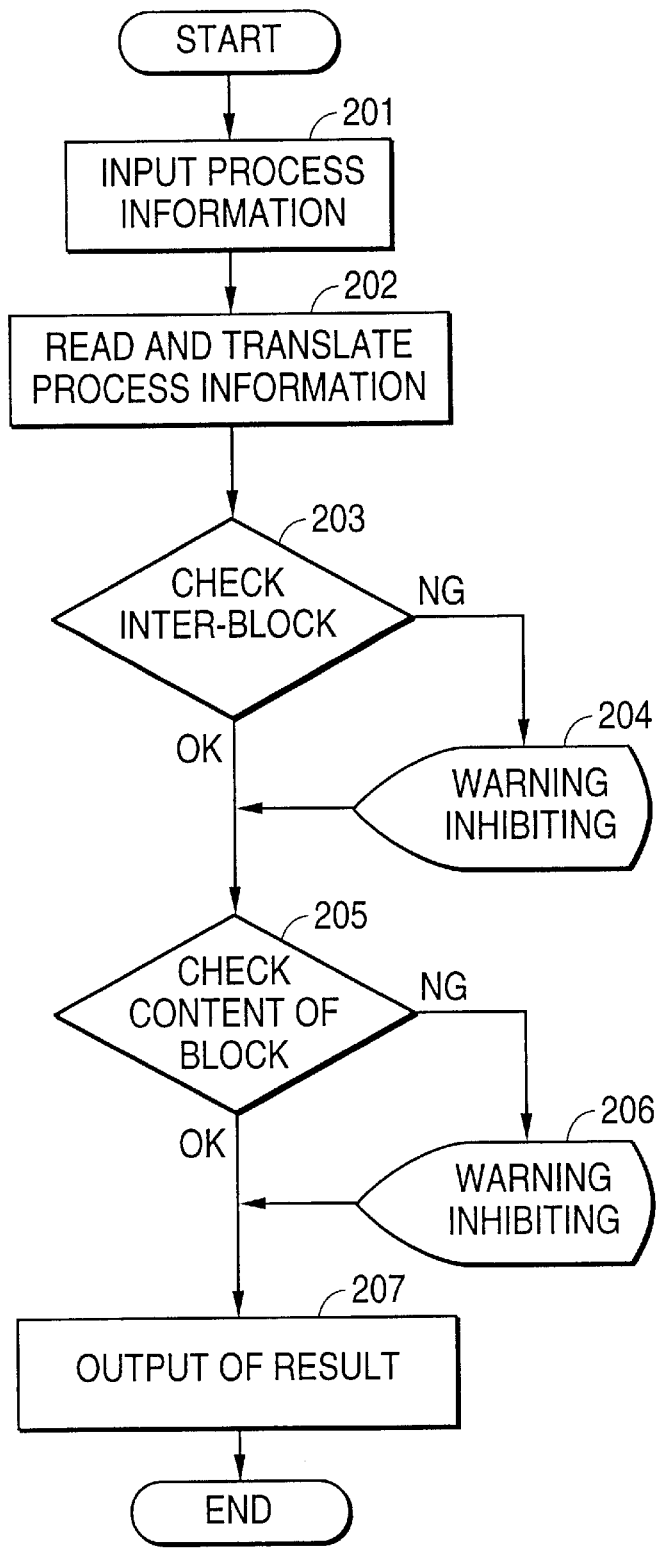
FIG. 17 is a flowchart illustrating the operation of the embodiment of the production process procedure checking system shown in FIG. 16.

Now, operation of the embodiment of the production process procedure checking system will be described with reference to FIGS. 16 and 17. FIG. 17 is a flowchart illustrating the operation of the embodiment of the production process procedure checking system shown in FIG. 16.

First, if a manually prepared production process information is inputted to the inference control unit 2, the input production process information is transferred from the inference control unit 2 to the first inference part A, 104 of the inference unit 3 (step 201).

With reference to the blocking knowledge part 104 included in the process flow blocking knowledge base 101 and constituted of the combinations of large process names and small process names, the first inference part A, 104 translates or converts the production process information into a predetermined format, which is composed of a flow of processes separated in units of large process name. The translated or converted production process information is transferred to the second inference part B, 105 (ship 202).

Figure 18:
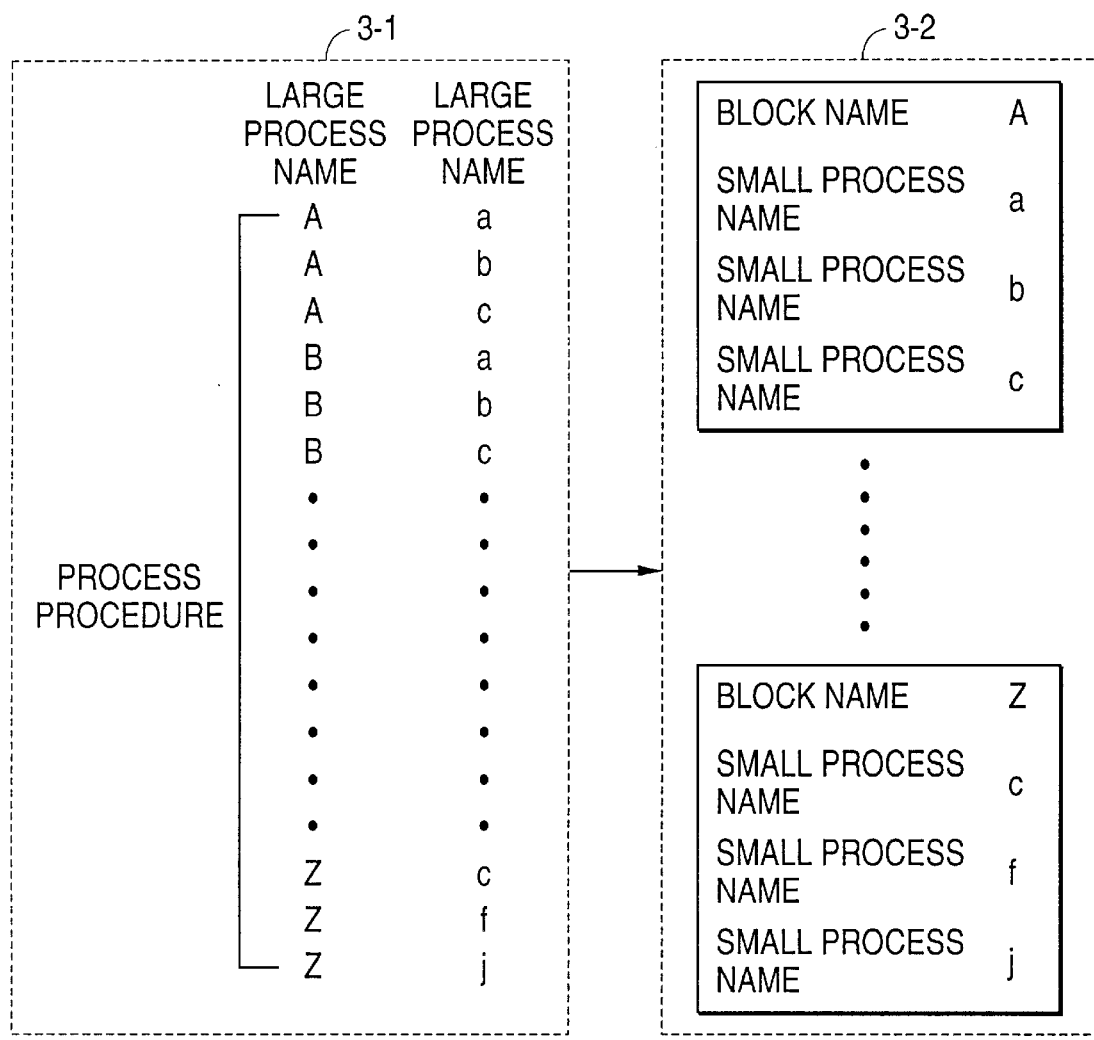
FIG. 18 diagrammatically illustrates a production process procedure data used in the production process procedure checking system shown in FIG. 16.

FIG. 18 diagrammatically illustrates a production process procedure data used in the production process procedure checking system of the shown embodiment. A production process procedure 3-1 in FIG. 18 shows one example of the production process information inputted to the inference control unit 2, and is translated or converted by the first inference part A, 104 into the separated production process procedure 3-2 which is separated into units of large process names. This blocked production process procedure will be called simple "blocked knowledge" hereinafter.

The second inference part B, 105 receives the blocked knowledge 3-2 from the first inference part A, 104, and refers to the block context discriminating knowledge part 102 in the process flow discriminating knowledge base unit 5, in order to check the arrangement sequence of individual block names in the blocked knowledge 3-2 (step 203). Namely, there is discriminated whether each of the blocks in the sequence of block names permitted, i.e., the block is an allowed process in the range of a predetermined condition, or is an inhibit process.

FIG. 19A illustrates an example of the content of the block context discriminating knowledge 102 in the production process procedure checking system shown in FIG. 16. As shown in FIG. 19A, the block context discriminating knowledge 102 is information stored in the form of a table in which the current block names are arranged along the axis of the abscissa and the next block names are arranged along the axis of the ordinate, each intersections holding the knowledge for discriminating the block context. According to this block context discriminating knowledge 102, it is discriminated that the block name "B" is allowed to follow the block name "A" in the range of the predetermined condition, which is indicated by "Δ". In FIG. 19A, the mark "O" indicates that there is no problem when the block name along the axis of the ordinate follows the block name along the axis of the abscissa, and the mark "x" indicates that the block name along the axis of the ordinate is inhibited to follow the block name along the axis of the abscissa.

Returning to FIG. 17, if the result of the discriminating of the block context in the step 203 indicates that there is no problem in the arrangement sequence of the block names ("OK" in step 203), the operation goes into a step 205. On the other hand, if it is discriminated that the block arrangement sequence is an inhibited one or is allowed in the range of the predetermined condition ("NG" in the step 203), an inhibit or warning alarming is outputted to the inference control unit 2 (step 204).

When the result of the discriminating of the block context in the step 203 is "OK", or when the processing of the step 204 is completed, the second inference pa B, 105 furthermore refers to the block content discriminating knowledge 103 in the process flow discriminating knowledge base unit 5, and compares the arrangement sequence of small process names In each block of the blocked knowledge 3-2 as shown in FIG. 18, with standard or model patterns of the arrangement sequence of small process names in an individual block, which is stored in the block content discriminating knowledge 103, in order to discriminate whether or not there is a problem in the arrangement sequence of small process names (step 205).

FIG. 19B illustrates an example of the content of the block content discriminating knowledge 103 in the production process procedure checking system shown in FIG. 16. As shown in FIG. 19B, the block content discriminating knowledge 103 includes various model patterns of the arrangement sequence of small process names in an individual block. For example, the model patterns of the arrangement sequence of small process names in the block "A" includes "a-b-c-d * * * " and "a-b-e-f * * * ".

As the result of the checking of the block content in the step 205, if the arrangement sequence of small process names is different from any of the model patterns of the arrangement sequence of small process names stored in the block content discriminating knowledge 103 ("NG" in step 205), an inhibit or warning alarming is outputted to the inference control unit 2, in accordance with the kind of the "NG" (step 206). If the arrangement sequence of small process names in each block is consistent with any of the model patterns of the arrangement sequence of small process names ("PK" in step 205), the operation goes into a step 207.

When the result of the discriminating of the block context in the step 205 is "OK", or when the processing of the step 206 is completed, the results of the discriminations in the steps 203 and 205 are supplied to the inference control unit 2, and a final result of discrimination is outputted through the result output unit 6.
EMBODIMENT 4

Now, another embodiment of the production process flow checking system in accordance with the present invention will be described with reference to FIG. 20, which is a block diagram of the embodiment of the production process procedure checking system in accordance with the present invention.

The production process procedure checking system includes a production process information 16, an inference control unit 17, an inference unit 18, a process flow blocking knowledge base unit 19 a process flow discriminating knowledge base unit 20 and a result output unit 21, which are coupled as s shown in FIG. 20. The inference unit 18 includes a first inference part A, 110 and a second inference part B, 111.

The production process information unit 16 contains information indicating the production process procedure of the multi-kind variable-amount production including a plurality of production processes. This information is constituted of various combinations of the small process name and the large process name including the small process name. Here, the production process procedure can be divided into one or more basic production process procedures (called "basic process procedure" hereinafter) and one or more derived block (called "derived block" hereinafter) which can be derivatively inserted into some number of blocks in the basic process procedure.

The inference control unit 17 receives the production process information, to supply the production process information to the first inference part A, 110, and controls a production process procedure discriminating of the first inference part A, 110 and the second inference part B, 111 of the inference unit 18, and supplies a result of the discrimination made in the inference unit 18 to the result output unit 21.

The first inference part A, 110 of the inference unit 3 receives the production process information from the inference control unit 17, and separates the production process procedure in units of large process, namely into a plurality of blocks each consisting of one large process, with reference to the process flow blocking knowledge base unit 19. The blocked production process procedure prepared by the first inference part A, 110 is transferred to the second inference part B, 111.

This second inference part B, 111 receives the information supplied from the first inference part A, 110, and discriminates, with reference to the process flow discriminating knowledge base unit 20, whether or not the insertion position of the derived block into the basic process is proper, procedure blocked in units of large process, and whether or not the arrangement sequence of the small process names in each of the blocks including the derived block(s) is proper. The result of the discrimination is supplied to the inference control unit 17.

The process flow blocking knowledge base unit 19 includes a blocking knowledge unit 106 constituted of various combinations of large process names and small process names, and a basic process procedure knowledge unit 107 which is the knowledge of basic process procedures of the production process procedures. Each of the above combinations is composed of one large process name and small process names included in that large process name.

The process flow discriminating knowledge base unit 20 includes a derived block position discriminating knowledge unit 108 which contains knowledge used for discriminating the insertion position of each derived block into the blocks of the basic process procedure, and a block content discriminating knowledge unit 109 which contains knowledge used for discriminating an arrangement order of small process names included in each process flow block.

The result output unit 21 receives the result of discrimination from the inference control unit 17, and outputs the result of discrimination in a predetermined format.

Now, operation of he embodiment of the production process procedure checking system will be described with reference to FIG. 20 and FIG. 17, which is a flowchart illustrating the operation of the first embodiment of the production process procedure checking system shown in FIG. 16.

First, if a manually prepared production process information 16 is inputted to the inference control unit 17, the input production process information is transferred from the inference control unit 17 to the first inference part A, 110 of the inference unit 18 (step 201).

With reference to the blocking knowledge part 106 included in the process flow blocking knowledge base unit 19 and constituted of the combinations of large process names and small process names, the first inference part A, 110 translates or converts the production process information 16 into a predetermined format, which is composed of a flow of processes blocked in units of large process name. The translated or converted production process information is transferred to the second inference part B, 111 (step 202).

Figure 21:
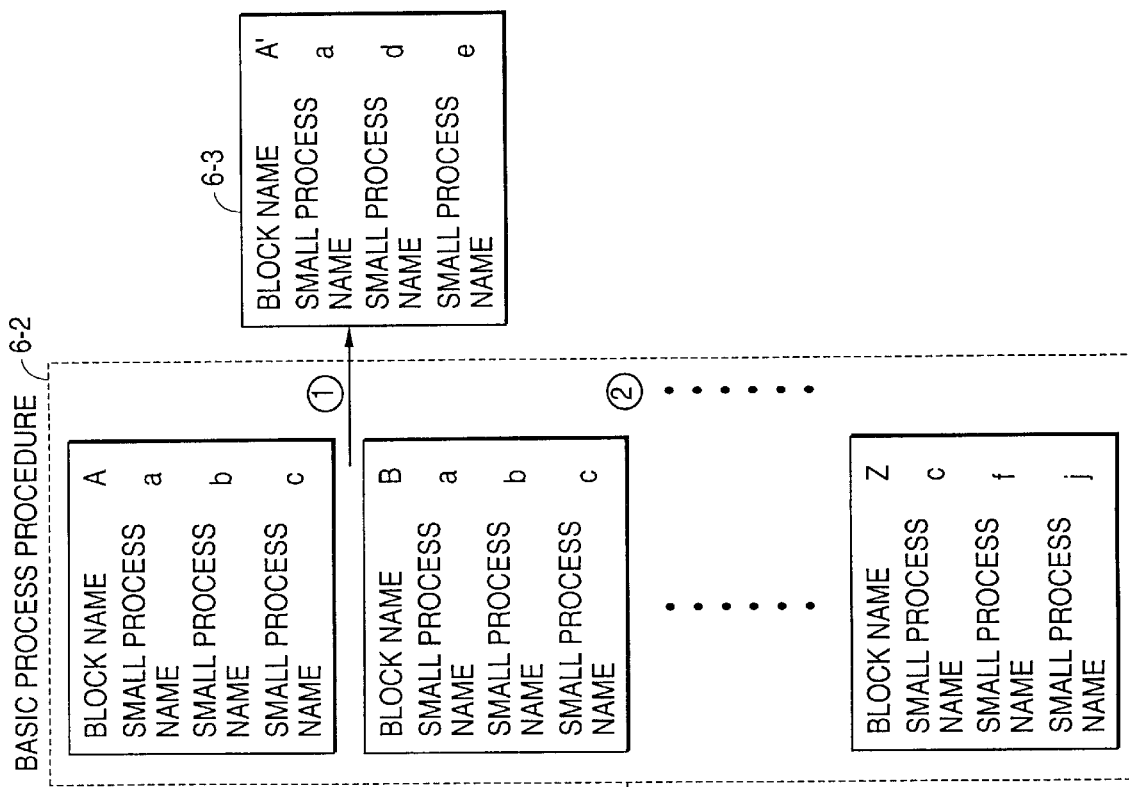
FIG. 21 diagrammatically illustrates a production process procedure data used in the production process procedure checking system shown in FIG. 20.

Here, referring to FIG. 21, there is diagrammatically illustrated a production process procedure data used in the production process procedure checking system of the shown second embodiment of the production process procedure checking system. A production process procedure 6-1 in FIG. 21 shows one example of the production process information 1 inputted to the inference control unit 17. In the first inference part A, 110, the production process procedure 6-1 is translated or converted into the blocked production process procedure blocked in units of large process name, and the blocked production process procedure is also divided into one basic process procedure 6-2 (which is also blocked in units of large process name) and at least one derived block 6-3. Here, in other cases, the production process procedure 6-1 may be divided into more than one basic process procedure 6-2 and more than one derived block 6-3.

The basic process procedure 6-2 and the derived block 6-3 are transferred from the first inference part A, 110 to the second inference part B, 111. With reference to the derived block position discriminating knowledge unit 108 in the process flow discriminating knowledge base unit 20, the second inference part B, 111 discriminates whether or not the insertion position of the derived block 6-3 into the basic process procedure 6-2 (step 203) is proper, and an inhibit or wag alarming is outputted to the inference control unit 2 if necessary (step 204).

Referring to FIG. 22, there is illustrated an example of the content of the derived block position discriminating knowledge unit 108 in the production process procedure checking system shown in FIG. 20. As shown in FIG. 22, the derived block position discriminating knowledge unit 108 contains information stored in the form of a table in which the derived block names are arranged along the axis of the abscissa and the block insertion positions are arranged along the axis of the ordinate, each intersections holding the knowledge for discriminating whether or not each derived block is allowed to be inserted into the corresponding insertion position. For example, according to this shown derived block position discriminating knowledge unit 108, it Is discriminated that if the derived block name "A'" is inserted in the insertion position ① of the basic process procedure as shown in FIG. 21, the insertion is allowable or normal (mark "O" in FIG. 22). On the other hand, if the derived block name "A'" is inserted in the insertion position ② of the basic process procedure as shown in FIG. 21, it is discriminated that the insertion is unallowable or not normal (mark "x" in FIG. 22).

After the insertion position of the derived block is checked in the steps 203 and 204, the second inference part B, 111 furthermore refers to the block content discriminating knowledge unit 109 in the process flow discriminating knowledge base unit 20, and compares the arrangement sequence of small process names in each of blocks included in the basic process procedure 6-2 and in each of the derived blocks 6-3, with model patterns of the arrangement sequence of small process names in an individual block, which is stored in the block content discriminating knowledge unit 109, in order to discriminate whether or not there is a problem in the arrangement sequence of small process names (step 205), and an Inhibit or warning alarming is outputted to the inference control unit 2, if necessary, (step 206).

The results of the discriminations in the steps 203 and 205 are supplied to the inference control unit 17, and a final result of discrimination is outputted through the result output unit 21 (step 207).

As seen from the above, the second embodiment of the production process procedure checking system is charaterized in that the checking is carried out after dividing the production process procedure into the basic process procedure and the derived blocks. With this feature, the knowledge base can be scaled down comparison with the second embodiment of the production process procedure checking system.

The invention has thus been shown and described with reference to the specific embodiments. However, it should be noted that the present invention is in no way limited to the details of the illustrated structures but changes and modifications may be made within the scope of the appended clams.

As seen from the above, the following advantages can be obtained in the production process flow preparing system in accordance with the present invention.

A first advantage of the present invention is that, since the process flow is expressed in units of process flow blocks in matching with an actual situation of the production line, and since the process flow is prepared while checking the arrangement sequence of process flow blocks in the process flow, the process flow can be precisely prepared for each product kind in a standardized manner, even if individual processes are not known.

A second advantage of the present invention is that, since the condition key is selected while monitoring or confirming the condition details for each one small process code, the condition key can be precisely inputted without input error.

A third advantage of the present invention is that, since modification of the process flow can be given to all the existing process flows or a selected one or ones of the existing process flows, it is possible to have, for all the product kinds, the process flows matching with the actual conditions of the production line.

Furthermore, the following advantages can be obtained in the production process flow checking system in accordance with the present invention.

The production process flow checking system in accordance with the present invention is not configured to check each of the process name on the basis of individual process names and the process context including the individual process name. The production process flow checking system in accordance with the present invention is characterized by checking the arrangement sequences of the process flow block names each composed of one large process including a plurality of small processes, and also checking the arrangement sequences of the small process names included in each process flow block. Therefore, the size of the knowledge base required for the checking can be reduced, and therefore, it is possible to speed up the checking operation and to make the maintenance easy.

In addition, in the production process flow checking system in accordance with the present invention, plurality of small processes are grouped into a process flow block composed of a combination of one large process name and a plurality of small process names. Furthermore, the arrangement sequence of the process flow blocks (namely, a rule for arranging the process flow block names) and the arrangement sequence of small process names in each process flow block are limited to a limited number of predetermined ones. Therefore, since the production process procedure can be standardized, the error checking can be reduced.

I claim:

1. A system for preparing a process flow having plural kinds of products with variable amounts of product in a production line including a plurality of production processes, comprising a process flow block code name storage knowledge unit storing a plurality of process flow block names each composed of a combination of large processes and small processes;

a process flow knowledge unit including a process flow block code knowledge unit storing a plurality of process flow block codes each converted or translated from a corresponding process flow block name of said process flow block names, and a process flow block code arrangement sequence knowledge unit which defines an arrangement sequence of each current process flow block and a next process flow block;

a condition key knowledge unit storing at least one item of condition key knowledge for each of said small processes;

a retrieval unit including a first retrieval part for retrieving the process flow block code and a second retrieval for retrieving a condition key a selector unit including a first selector for selecting and/or storing the process flow block codes, to discriminating the arrangement sequence of the process flow block codes, and a second selector for selecting and/or storing the condition key, a process flow display for displaying a prepared process flow, an inconvenience of the arrangement sequence of the process flow block codes in said prepared process flow, and the degree of perfection of said prepared process flow;

process flow information modification means for modifying at least one of (1) said process flow block codes, (2) said arrangement sequence and (3) said condition key knowledge and for determining each kind of product corresponding to said modification;

data transfer means for transferring said modifications for each determined kind of product; and a process flow storage for storing said modification for each determined kind of product.

2. A system for preparing a process flow having plural kinds of products with variable amounts of overall in a production line including a plurality of production processes, comprising a process flow block code name storage knowledge unit storing a plurality of process flow block names each composed of a combination of large processes and small processes;

a process flow knowledge unit including a process flow block code knowledge unit storing a plurality of process flow block codes each converted or translated from a corresponding process flow block name of said process flow block names, and a process flow block code arrangement sequence knowledge unit which defines an arrangement sequence of each current process flow block and a next process flow block;

a condition key knowledge unit storing at least one item of condition key knowledge for each of said small processes;

a retrieval unit including a first retrieval part for retrieving the process flow block code to be modified and a process flow arrangement sequence knowledge, and a second retrieval for retrieving a condition key for said process flow block code to be modified;

a selector unit including a first selector for selecting and/or storing process flow block code to be modified and said process flow arrangement sequence knowledge, and a second selector for selecting and/or storing said condition key for said process flow block code to be modified;

a process flow display for displaying said selected and modified process flow code, said process flow arrangement sequence knowledge, and said condition key, and also for displaying an inconvenience point in the modification and an inconvenience product kind in the modification;

a process flow information modification means for modifying the process flow information to be modified said modification means further determining each kind of product corresponding to said modified process flow information;

a data transfer means for selectively transferring a modified content to a process flow information of each determined kind of product; and a process flow storage for storing the modified process flow for each determined kind of product.

3. A method for preparing a process flow having plural kinds of products with variable amounts of product in a production line including a plurality of production processes, comprising the steps:

retrieving a target process flow block code from a process flow block code name storage knowledge unit storing a plurality of process flow block names each composed of a combination of large processes and small processes, selecting said target process flow block code by use of a first selector, similarly selecting a process flow block code next to said target process flow block code, and preparing a process flow while discriminating an arrangement sequence of thus selected process flow block code in said process flow, with reference to a process flow arrangement sequence knowledge;

retrieving a small process code with reference to a condition key knowledge unit storing at least one item of condition key knowledge for each of said small processes, so as to select a condition key by use of a second selector;

displaying the process flow thus prepared by use of a process flow display means, and storing a completed process flow in units of product kind;

process flow information modification means for modifying at least one of (1) said selected process flow block codes, (2) said arrangement sequence and (3) said condition key knowledge and for determining each kind of Product corresponding to said modification;

data transfer means for transferring said modification for each determined kind of product; and a process flow storage for storing said modification for each determined kind of product.

4. A production process procedure checking system for use in a production line including a plurality of production processes, comprising:
- a first inference means receiving a production process procedure information composed of combinations of large process names and small process names which are in a hierarchical relation, said first inference means referring to a process flow blocking knowledge base including a plurality of process flow block names each composed of a combination of large processes and small processes, and dividing said production process procedure into one or more process flow blocks each composed of one large process; and
- a second inference means receiving information of each of said one or more process flow blocks from said first inference means, said second inference means referring to a process flow discriminating knowledge base including a block context discriminating knowledge for discriminating a block context including each process flow block name and a block content discriminating knowledge for discriminating an arrangement sequence of small process names included in each process flow block, and discriminating whether or not there is proper an arrangement sequence of said one or more process flow blocks and whether or not proper the arrangement sequence of small process names included in each process flow block.

5. A system claimed in claim 4 wherein said block content discriminating knowledge includes, for each of the process flow blocks, at least one model pattern in which one or more small process names are arranged in a sequence predetermined for a corresponding process flow block, and said second inference means compares the arrangement sequence of small process names included in each process flow block, with said at least one model pattern, for discriminating whether or not the arrangement sequence of small process names included in each process flow block is proper.

6. A production process procedure checking system for use in a production line including a plurality of production processes, comprising:
- a first inference means receiving a production process procedure information composed of combinations of large process names and small process names which are in a hierarchical relation, said first inference means referring to a process flow blocking knowledge base containing a blocking knowledge including a plurality of process flow block names each composed of a combination of large processes and small processes, and a basic process procedure knowledge storing information of a predetermined basic process procedure, and dividing said production process procedure into one or more basic process procedures each composed of one or more large process, and one or more derived blocks each composed of one large process; and
- a second inference means receiving information of each of said one or more basic process procedures and said one or more derived blocks from said first inference means, said second inference means referring to a process flow discriminating knowledge base including a derived block insertion position discriminating knowledge for discriminating an insertion position of each derived block into said basic process procedure and a block content discriminating knowledge for discriminating an arrangement sequence of small process names included in each process flow block, and discriminating whether or not there is proper the insertion position of each of said one or more derived block into a corresponding one of said one or more basic process procedures, and whether or not proper the arrangement sequence of small process names included in each process flow block.

7. A system claimed in claim 6 wherein said block content discriminating knowledge includes, for each of the process flow blocks, at least one model pattern in which one or more small process names are arranged in a sequence predetermined for a corresponding process flow block, and said second inference means compares the arrangement sequence of small process names included in each process flow block, with said at least one model pattern, for discriminating whether or not the arrangement sequence of small process names included in each process flow block is proper.

8. A method for preparing a process flow in a production line including a plurality of products and production processes, comprising:
- storing a plurality of process flow block names each composed of a combination of large processes names and small processes names;
- storing a plurality of process flow block codes each converted or translated from a corresponding process flow block name of said process flow block names, and a process flow block code arrangement sequence knowledge table defining an arrangement sequence of each current process flow block and a next process flow block;
- storing at least one item of a condition key knowledge for each of said small processes;
- selectively retrieving the process flow block code and the condition key;
- selecting and/or storing the process flow block codes, to discriminating the arrangement sequence of the process flow block codes, and selecting and/or storing the condition keys;
- displaying a prepared process flow and an inconvenience of the arrangement sequence of the process flow block codes in said prepared process flow; and
- modifying at least one of (1) said process flow block codes, (2) said arrangement sequence and (3) said condition key knowledge;
- determining each kind of product corresponding to said modification; and
- transferring said modification for storage in a storage unit for controlling said modification.

9. A method for preparing a process flow in a production line including a plurality of products and production processes, comprising:
- storing a plurality of process flow block names each composed of a combination of large processes and small processes;
- storing a plurality of process flow block codes each converted or translated from a corresponding process flow block name of said process flow block names, and a process flow block code arrangement sequence knowledge table which defines an arrangement sequence of each current process flow block and a next process flow block;
- storing at least one item of condition key knowledge for each of said small processes;
- selectively retrieving the process flow block code to be modified and a process flow arrangement sequence knowledge, and retrieving a condition key for said process flow block code to be modified;

selecting and/or storing a process flow block code to be modified and said process flow arrangement sequence knowledge, and selecting and/or storing said condition key for said process flow block code to be modified;

displaying said selected and modified process flow code, said process flow arrangement sequence knowledge, and said condition key, and also displaying an inconvenience point in the modification and an inconvenience product kind in the modification;

modifying the process flow information to be modified;

selectively transferring a modified content to a process flow of each product kind; and storing the modified process flow.

* * * * *